US012594502B2

(12) United States Patent
Zhang et al.

(10) Patent No.: US 12,594,502 B2
(45) Date of Patent: Apr. 7, 2026

(54) CONTENT STREAM PROCESSING

(71) Applicant: Tencent Technology (Shenzhen) Company Limited, Shenzhen (CN)

(72) Inventors: Zhidong Zhang, Shenzhen (CN); Liang Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 364 days.

(21) Appl. No.: 18/201,591

(22) Filed: May 24, 2023

(65) Prior Publication Data

US 2023/0294001 A1 Sep. 21, 2023

Related U.S. Application Data

(63) Continuation of application No. PCT/CN2022/131881, filed on Nov. 15, 2022.

(30) Foreign Application Priority Data

Feb. 8, 2022 (CN) .......................... 202210117818.6

(51) Int. Cl.
A63F 13/71 (2014.01)
A63F 13/355 (2014.01)
(Continued)

(52) U.S. Cl.
CPC ............ A63F 13/71 (2014.09); A63F 13/355 (2014.09); H04L 67/131 (2022.05); H04L 67/75 (2022.05)

(58) Field of Classification Search
CPC ................................ A63F 13/71; A63F 13/355
See application file for complete search history.

(56) References Cited

U.S. PATENT DOCUMENTS

| 10,898,815 B1 * | 1/2021 | Jia ........................ H04N 21/2668 |
| 2013/0196761 A1 * | 8/2013 | Doorgeest ............... A63F 13/87 |
| | | 463/31 |

(Continued)

FOREIGN PATENT DOCUMENTS

| CN | 109819300 A | 5/2019 |
| CN | 111669605 A | 9/2020 |
| CN | 114461423 A | 5/2022 |

OTHER PUBLICATIONS

English Translation of CN109819300 (Year: 2019).*

(Continued)

*Primary Examiner* — Jay Trent Liddle
(74) *Attorney, Agent, or Firm* — ARENTFOX SCHIFF LLP

(57) ABSTRACT

In a method for content stream processing, a coded content stream of a content stream is received from a server. Second trigger timing information of the coded content stream is obtained. The second trigger timing information is determined based on first trigger timing information of the content stream and stream time change information. The stream time change information indicates a timing change between the coded content stream and the content stream. The first trigger timing information indicates a target event in the content stream. The coded content stream is decoded. The decoded content stream is played back. When the decoded content stream is played to the target event indicated by the second trigger timing information, specified processing corresponding to the target event is performed.

19 Claims, 13 Drawing Sheets

(51) Int. Cl.
　　H04L 67/131　　　　(2022.01)
　　H04L 67/75　　　　(2022.01)

(56)　　　　　　　References Cited

U.S. PATENT DOCUMENTS

| | | | |
|---|---|---|---|
| 2023/0027170 A1* | 1/2023 | Ciarniello | H04N 21/42684 |
| 2023/0051868 A1* | 2/2023 | Du | H04N 21/4788 |
| 2023/0294001 A1* | 9/2023 | Zhang | A63F 13/71 |
| | | | 463/42 |
| 2025/0150509 A1* | 5/2025 | Schmidli | H04L 67/34 |

OTHER PUBLICATIONS

Office Action received for Chinese Patent Application No. 202210117818.6, mailed on Jan. 8, 2025, with English translation, 23 pages.

International Search Report and Written Opinion received for PCT Patent Application No. PCT/CN2022/131881, mailed on Jan. 18, 2023, 13 pages (3 pages of English Translation and 10 pages of Original Document).

\* cited by examiner

Terminal 400

First memory 450

Server 200

Second memory 250

| Second operating system 251 |
| Second network communication module 252 |
| Second input processing module 254 |
| Second multimedia stream processing apparatus 255 |

Second network interface 220

Second processor 210

Second bus system 240

Event marking module 2551

Information coding module 2552

Information obtaining module 2553

Information transmission module 2554

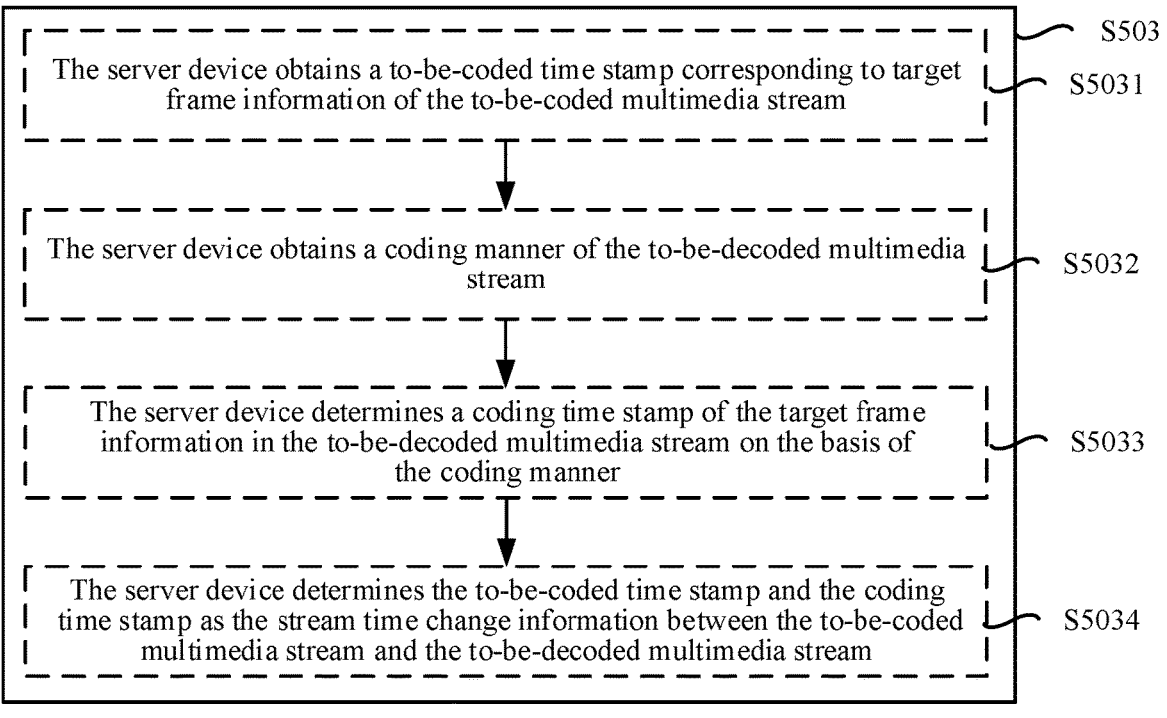

The server device obtains a to-be-coded time stamp corresponding to target frame information of the to-be-coded multimedia stream                S503
                                                                                                                          S5031

The server device obtains a coding manner of the to-be-decoded multimedia stream                S5032

The server device determines a coding time stamp of the target frame information in the to-be-decoded multimedia stream on the basis of the coding manner                S5033

The server device determines the to-be-coded time stamp and the coding time stamp as the stream time change information between the to-be-coded multimedia stream and the to-be-decoded multimedia stream                S5034

FIG. 7b

Virtual scene 8-1

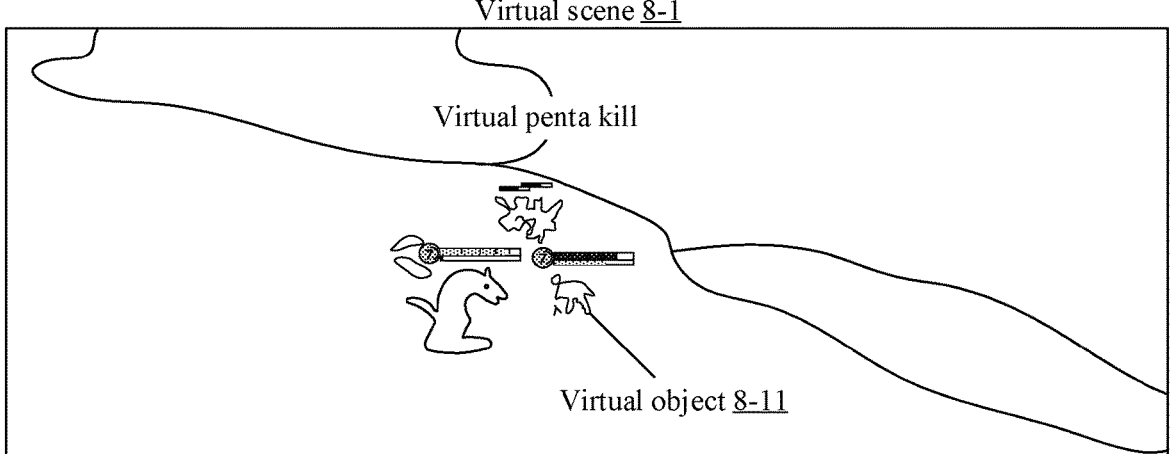

Virtual penta kill

Virtual object 8-11

FIG. 8

Time stamp 9-11 of a "virtual penta
kill" event

Time stamp 9-21 of a "virtual penta
kill" event

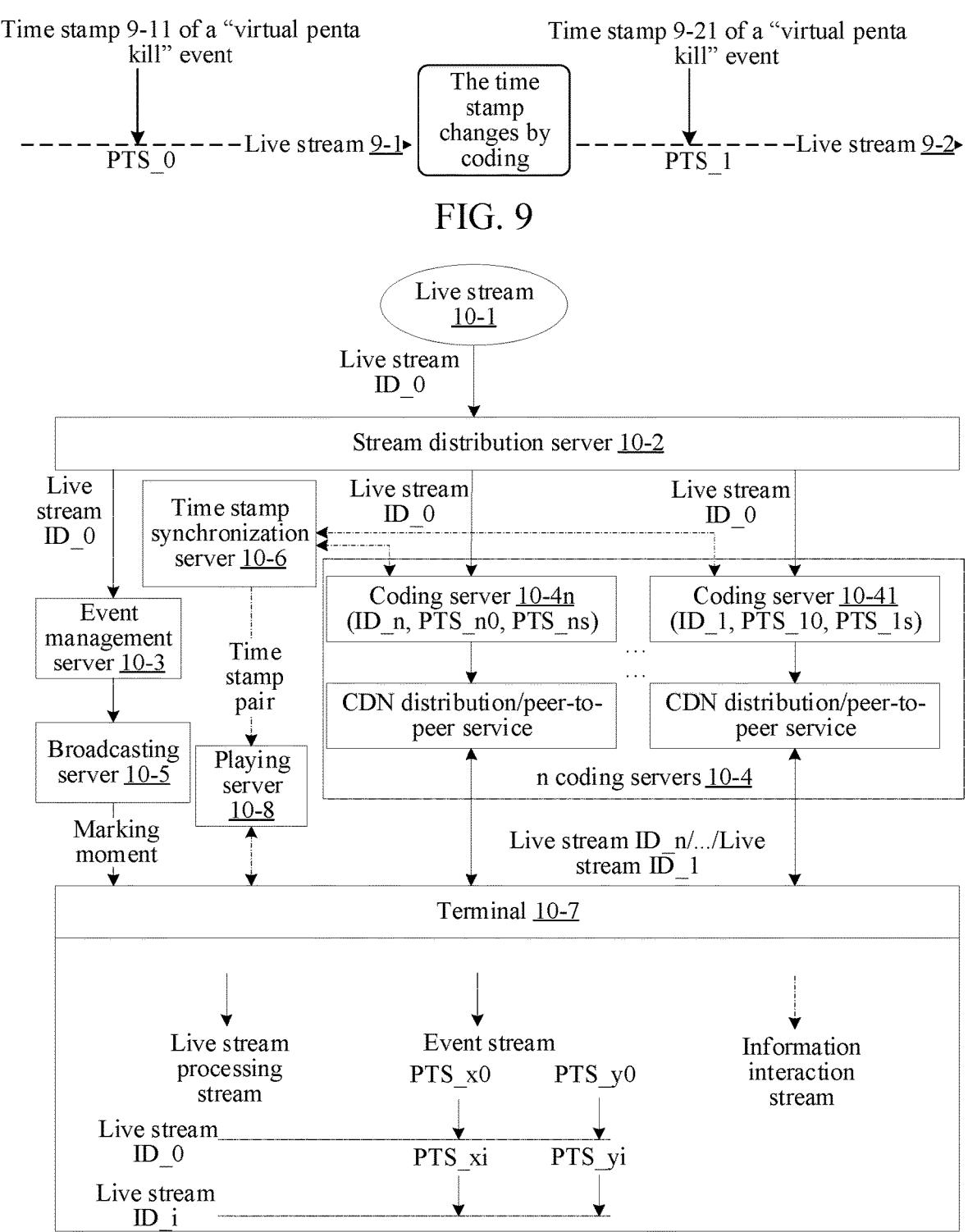

— — — — — — — — —Live stream 9-1▸
PTS_0

The time
stamp
changes by
coding

— — — — — — —Live stream 9-2▸
PTS_1

FIG. 9

Live stream
10-1

Live stream
ID_0

Stream distribution server 10-2

Live
stream
ID_0

Time stamp
synchronization
server 10-6

Live stream
ID_0

Live stream
ID_0

Event
management
server 10-3

Time
stamp
pair

Coding server 10-4n
(ID_n, PTS_n0, PTS_ns)

Coding server 10-41
(ID_1, PTS_10, PTS_1s)

Broadcasting
server 10-5

Playing
server
10-8

CDN distribution/peer-to-
peer service

CDN distribution/peer-to-
peer service n coding servers 10-4

Marking
moment

Live stream ID_n/.../Live
stream ID_1

Terminal 10-7

Live stream
processing
stream

Event stream

PTS_x0          PTS_y0

Information
interaction
stream

Live stream
ID_0

PTS_xi          PTS_yi

Live stream
ID_i

FIG. 10

CONTENT STREAM PROCESSING

RELATED APPLICATIONS

The present application is a continuation of International Application No. PCT/CN2022/131881 filed on Nov. 15, 2022, which claims priority to Chinese Patent Application No. 202210117818.6 filed on Feb. 8, 2022. The entire disclosures of the prior applications are hereby incorporated by reference.

FIELD OF THE TECHNOLOGY

This disclosure relates to an information processing technology in the field of computer applications, including to multimedia stream processing methods and apparatuses, devices, a computer-readable storage medium, and a computer program product.

BACKGROUND OF THE DISCLOSURE

During processing of multimedia information such as audios and videos, it may be necessary to mark an event moment in the multimedia information on a server device and transmit the marked event moment to a player device, so that the player device triggers specified processing when the multimedia information is played to the event moment. For example, when a "virtual penta kill" moment is marked on the server device, and the marked "virtual penta kill" moment is transmitted to the player device, so that the player device triggers presentation of a virtual red packet when a game is played to the "virtual penta kill" moment.

In order to enable the player device to obtain the event moment, the server device may directly send the marked event moment to the player device. However, since the multimedia information received by the player device is coded by the server device, the coding of the multimedia information could change a time stamp corresponding to frame information of the multimedia information. Therefore, time, corresponding to the event moment obtained by the player device, in the coded multimedia information may no longer be a moment at which an event occurs, which affects the accuracy of an event occurrence moment in the coded multimedia information, thereby affecting the accuracy of triggering specified processing.

SUMMARY

Embodiments of this disclosure provide content stream processing methods and apparatuses, devices, a non-transitory computer-readable storage medium, and a computer program product, which can improve the accuracy of triggering specified processing.

Technical solutions in the embodiments of this disclosure can include the following implementations.

The embodiments of this disclosure provide a method for content stream processing. The method is performed by a player device, for example. In the method for content stream processing, a coded content stream of a content stream is received from a server. Second trigger timing information of the coded content stream is obtained. The second trigger timing information is determined based on first trigger timing information of the content stream and stream time change information. The stream time change information indicates a timing change between the coded content stream and the content stream. The first trigger timing information indicates a target event in the content stream. The coded content stream is decoded. The decoded content stream is played back. When the decoded content stream is played to the target event indicated by the second trigger timing information, specified processing corresponding to the target event is performed.

The embodiments of this disclosure further provide a method for content stream processing. The method is performed by a server device, for example. Event marking is performed on a content stream to obtain first trigger timing information of a target event in the content stream. The content stream is coded to obtain a coded content stream. Stream time change information that indicates a timing change between the coded content stream and the content stream is obtained. The coded content stream is transmitted based on the first trigger timing information and the stream time change information, second trigger timing information of the target event in the coded content stream being determined based on the first trigger timing information and the stream time change information.

The embodiments of this disclosure provide an information processing apparatus, such as a first content stream processing apparatus. The information processing apparatus includes processing circuitry that is configured to receive a coded content stream of a content stream from a server. The processing circuitry is configured to obtain second trigger timing information of the coded content stream. The second trigger timing information is determined based on first trigger timing information of the content stream and stream time change information The stream time change information indicating a timing change between the coded content stream and the content stream. The first trigger timing information indicates a target event in the content stream. The processing circuitry is configured to decode the coded content stream. The processing circuitry is configured to play back the decoded content stream. The processing circuitry is configured to perform, when the decoded content stream is played to the target event indicated by the second trigger timing information, specified processing corresponding to the target event.

The embodiments of this disclosure provide an information processing apparatus, such as a second content stream processing apparatus. The information processing apparatus including processing circuitry that is configured to perform event marking on a content stream to obtain first trigger timing information of a target event in the content stream. The processing circuitry is configured to code the content stream to obtain a coded content stream. The processing circuitry is configured to obtain stream time change information that indicates a timing change between the coded content stream and the content stream. The processing circuitry is configured to transmit the coded content stream based on the first trigger timing information and the stream time change information. Second trigger timing information of the target event in the coded content stream is determined based on the first trigger timing information and the stream time change information.

The embodiments of this disclosure provide a player device, including a first memory and a first processor. The first memory is configured to store computer-executable instructions. The first processor is configured to implement, when executing the computer-executable instructions stored in the first memory, the method provided in the embodiments of this disclosure and applied to the player device.

The embodiments of this disclosure provide a server device, including a second memory and a second processor. The second memory is configured to store computer-executable instructions. The second processor is configured to implement, when executing the computer-executable instructions stored in the second memory, the method provided in the embodiments of this disclosure and applied to the server device.

The embodiments of this disclosure provide a non-transitory computer-readable storage medium, storing instructions which when executed by a processor cause the processor to perform any of the methods for content stream processing.

The embodiments of this disclosure provide a computer program product, including a computer program or computer-executable instructions, the computer program or computer-executable instructions, when executed by a processor, implementing any of the methods for content stream processing.

The embodiments of this disclosure can at least have the following beneficial effects. Among the at least one event triggering moment obtained by the player device, each event triggering moment is obtained by adjusting the at least one event marking moment on the basis of the stream time change information, and the stream time change information refers to the time change before and after the coding of the content stream. Therefore, each event triggering moment obtained by the player device is a moment at which an event in a to-be-decoded live stream occurs. In this way, the event triggering moment is accurate in the to-be-played content stream obtained by decoding the to-be-decoded content stream. Thus, in the process of playing the to-be-played content stream, a played content matches the event triggering moment. Accordingly, if any event triggering moment to which the to-be-played content stream is played is just a moment of playing the event content, at this time, the specified processing is triggered, so that the accuracy of triggering specified processing can be improved.

BRIEF DESCRIPTION OF THE DRAWINGS

FIG. 7b is a schematic diagram of obtaining stream time change information according to an embodiment of this disclosure.

FIG. 8 is a schematic diagram of an exemplary event picture according to an embodiment of this disclosure.

FIG. 9 is a schematic diagram illustrating that an exemplary time stamp changes according to an embodiment of this disclosure.

FIG. 10 is a schematic diagram of an architecture of a live stream system according to an embodiment of this disclosure.

DESCRIPTION OF EMBODIMENTS

Figure 1:
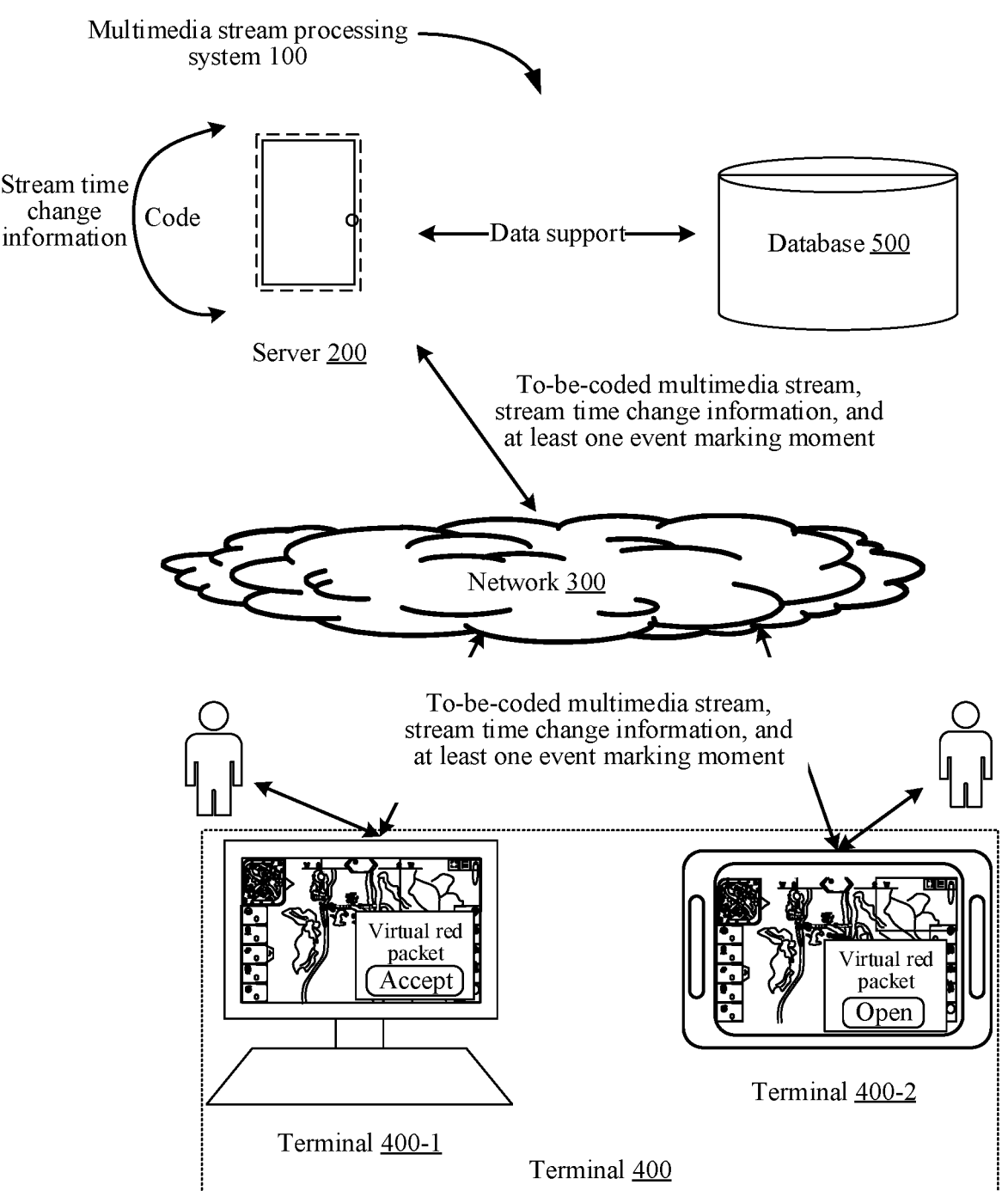
FIG. 1 is a schematic diagram of an architecture of a first multimedia stream processing system provided according to an embodiment of this disclosure.

To make the objectives, technical solutions, and advantages of this disclosure clearer, the following describes this disclosure in further detail with reference to the accompanying drawings. The described embodiments are not to be considered as a limitation to this disclosure. Other embodiments are within the scope of this disclosure.

In the following description, the term "some embodiments" describes subsets of all possible embodiments, but it may be understood that "some embodiments" may be the same subset or different subsets of all the possible embodiments, and can be combined with each other without conflict.

In the following description, the term "first\second\third" is merely used to distinguish similar objects and does not represent a specific order of the objects. It may be understood that "first\second\third" can be interchanged in a specific order or precedence where permitted, to enable the embodiments of this disclosure described herein to be implemented in a sequence other than that illustrated or described here.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

Unless otherwise defined, all technical and scientific terms used in the embodiments of this disclosure have the same meaning as commonly understood by those skilled in the art of this disclosure. Terms used in the embodiments of this disclosure are merely intended to describe objectives of the embodiments of this disclosure, but are not intended to limit this disclosure.

Before the embodiments of this disclosure are further described in detail, an exemplary description is made on nouns and terms in the embodiments of this disclosure, and the nouns and terms in the embodiments of this disclosure are applicable to the following explanations.

1) A client may include an application program run on a device to provide various services, for example, an instant messaging client, a video client, and a livestreaming client. A player device may refer to a device running a client configured to play a multimedia stream. A server device may refer to a backend server that interacts with a player device and provides computing services to the player device.

2) Cloud computing may include a computing mode that distributes computing tasks to a resource pool composed of a large number of computers to enable various application systems to obtain computing power, storage spaces, and information services as needed. A network that provides resources for the resource pool may be referred to as "cloud". Users may think that resources in the "cloud" can be infinitely expanded and can be obtained at any time, used on demand, expanded at any time, and paid for according to use. In this embodiment of this disclosure, the server device may be a cloud device.

3) Artificial Intelligence (AI), for example, involves a theory, a method, a technology, and an application system that use a machine controlled by a digital computer to simulate, extend, and expand human intelligence, sense an environment, obtain knowledge, and use the knowledge to obtain an optimal result. In the embodiments of this disclosure, event marking can be performed in combination with artificial intelligence, such as determining a triggering moment of specified processing on the basis of artificial intelligence.

During processing of content information, such as multimedia information (for example, a multimedia stream) including audio and/or video, it may be necessary to mark an event moment in the multimedia information on a server device and transmit the marked event moment to a player device, so that the player device triggers specified processing when the multimedia information is played to the event moment.

In order to enable the player device to obtain the event moment, the server device may directly carry the event moment in Supplemental Enhancement Information (SEI) of frame information of the multimedia information, and code the SEI, so that the player device obtains the event moment by means of decoding the SEI. However, in the process of obtaining the event moment by the player device, the server device needs to support coding of the SEI, and the player device needs to support decoding of the SEI. This only applies to devices that support coding and decoding of the SEI, which affects the universality.

In addition, when the server device carries the event moment in the SEI of the multimedia information, a size of the multimedia information is increased. This will increase a bit rate of the multimedia information and affect the resource consumption of a transmission network. Furthermore, after decoding the SEI to obtain the event moment, the player device may need to transmit the event moment to an application layer through a callback function, which reduces resource consumption and affects the fluency of playing of the multimedia information. Moreover, there may be a situation where the player device cannot invoke the callback function during the decoding of the SEI (such as without an interface for the callback function). In this way, the application layer will not be able to obtain the event moment and cannot achieve triggering of the specified processing based on the event moment. There are still decoding errors, causing abnormal playing of the multimedia information. Thus, the stability of triggering specified processing is affected.

In addition, if the server device directly transmits the marked event moment to the player device, since coding the multimedia information by the server device may change a presentation time stamp corresponding to the frame information of the multimedia information, a moment, corresponding to the received event moment, in the decoded multimedia information may no longer be the moment at which the event occurs. As a result, the marked event moment can fail, which affects the accuracy of triggering specified processing.

Embodiments of this disclosure provide multimedia stream processing methods and apparatuses, devices, a computer-readable storage medium, and a computer program product, which can improve the stability, accuracy, and universality of triggering specified processing. The following illustrates exemplary applications of a device provided in the embodiments of this disclosure. The device provided in the embodiments of this disclosure may be implemented as various types of terminals such as a smartphone, a smartwatch, a laptop, a tablet, a desktop computer, a smart appliance, a set-top box, a smart vehicle-mounted device, a portable music player, a personal digital assistant, a specialized messaging device, an intelligent voice interaction device, a portable gaming device, and a smart speaker, and may also be implemented as a server. An exemplary application will be explained when the player device is implemented as a terminal and the server device is implemented as a server.

Referring to FIG. 1, FIG. 1 is a first schematic diagram of an architecture of a multimedia stream processing system provided according to an embodiment of this disclosure. As shown in FIG. 1, in order to support a multimedia stream application, in the multimedia stream processing system 100, a terminal 400 (referred to as a player device, exemplarily showing a terminal 400-1 and a terminal 400-2) is connected to a server 200 (referred to as a server device) through a network 300. The network 300 may be a wide area network, a local area network, or a combination of the wide area network and the local area network. In addition, the multimedia stream processing system 100 also includes a database 500 used for providing a data support for the server 200. Moreover, FIG. 1 shows a situation where the database 500 is independent of the server 200. In addition, the database 500 may also be integrated in the server 200. This embodiment of this disclosure does not limit this.

The terminal 400 is configured to receive, via the network 300, a to-be-decoded multimedia stream, stream time change information, and at least one event marking moment transmitted by the server 200, and adjust the at least one event marking moment on the basis of the stream time change information to obtain at least one event triggering moment, the stream time change information referring to a time change before and after coding of a multimedia stream, and each event marking moment referring to an event moment in the multimedia stream before coding; decode the to-be-decoded multimedia stream to obtain a to-be-played multimedia stream, and play the to-be-played multimedia stream; and perform, in a case that the to-be-played multimedia stream is played to a target event triggering moment, specified processing (for example, displaying a virtual resource packet on an interface of the terminal 400-1 or the terminal 400-2) corresponding to the target event triggering moment, the target event triggering moment being any one of the at least one event triggering moment.

The server 200 is configured to perform event marking on a to-be-coded multimedia stream to obtain the at least one event marking moment; code the to-be-coded multimedia stream to obtain the to-be-decoded multimedia stream; obtain the stream time change information between the to-be-coded multimedia stream and the to-be-decoded multimedia stream; and transmit the at least one event marking moment, the stream time change information, and the to-be-decoded multimedia stream to the terminal 400 via the network 300, so that the terminal 400 adjusts the at least one event marking moment on the basis of the stream time change information to obtain at least one event triggering moment, plays the to-be-played multimedia stream by decoding the to-be-decoded multimedia stream, and performs, when the to-be-played multimedia stream is played to the target event triggering moment, the specified processing corresponding to the target event triggering moment.

Figure 2:
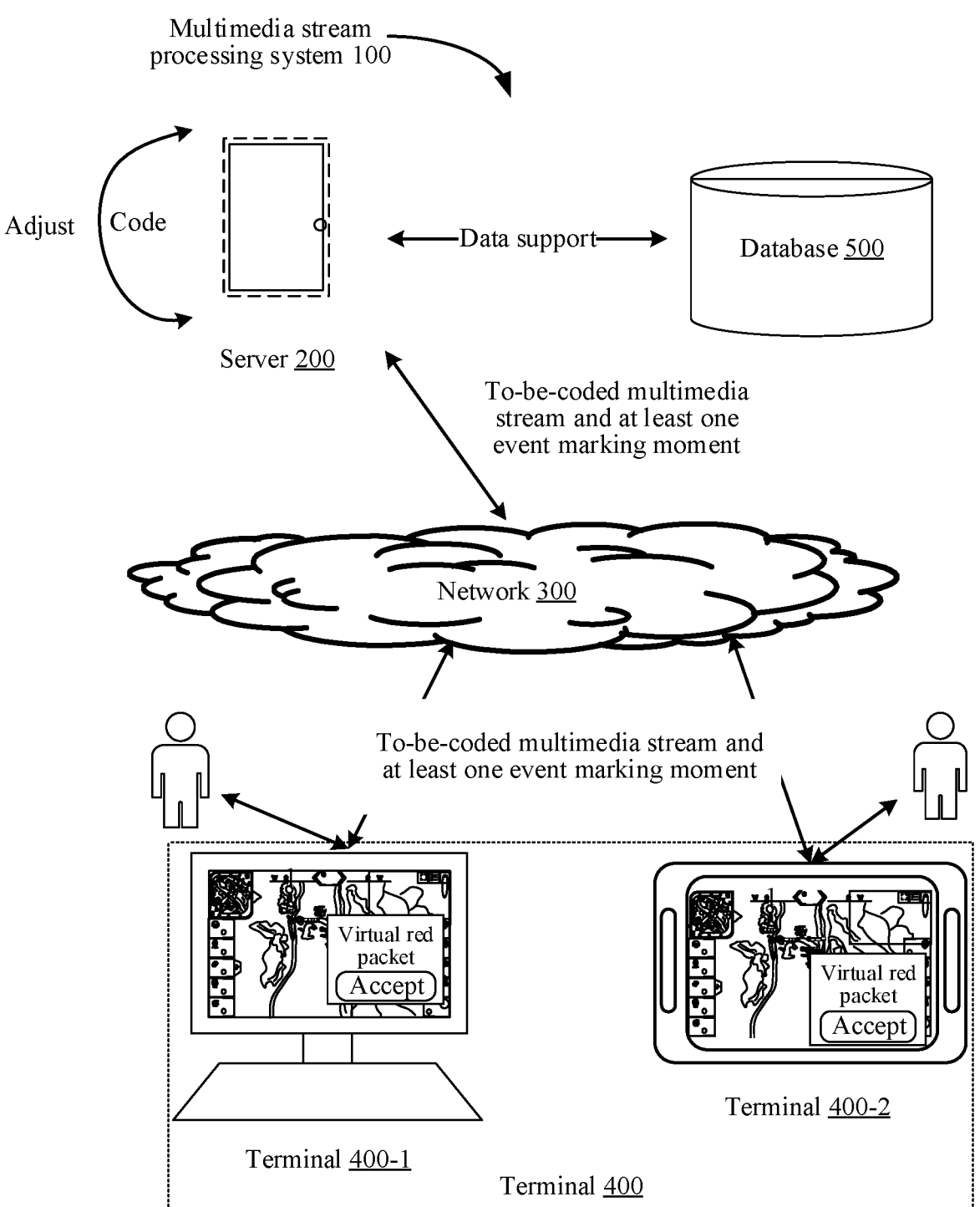
FIG. 2 is a schematic diagram of an architecture of a second multimedia stream processing system provided according to an embodiment of this disclosure.

Based on FIG. 1, referring to FIG. 2, FIG. 2 is a second schematic diagram of an architecture of a multimedia stream processing system provided according to an embodiment of this disclosure. As shown in FIG. 2, a difference from FIG. 1 is that an interaction process between the terminal 400 and the server 200 is shown.

The terminal 400 is configured to receive, via the network 300, a to-be-decoded multimedia stream transmitted by the server 200 and at least one event triggering moment corresponding to the to-be-decoded multimedia stream, the at least one event triggering moment being obtained by adjusting at least one event marking moment by the server 200 on the basis of stream time change information, the stream time change information referring to a time change before and after coding of a multimedia stream, and each event marking moment referring to an event moment in the multimedia stream before coding; play a to-be-played multimedia stream by decoding the to-be-decoded multimedia stream; and perform, in a case that the to-be-played multimedia stream is played to a target event triggering moment, specified processing corresponding to the target event triggering moment, the target event triggering moment being any one of the at least one event triggering moment.

The server 200 is configured to perform event marking on a to-be-coded multimedia stream to obtain the at least one event marking moment; code the to-be-coded multimedia stream to obtain the to-be-decoded multimedia stream; obtain the stream time change information between the to-be-coded multimedia stream and the to-be-decoded multimedia stream; adjust the at least one event marking moment on the basis of the stream time change information to obtain the at least one event triggering moment; and transmit the at least one event triggering moment and the to-be-decoded multimedia stream to the terminal 400 via the network 300, so that the terminal 400 plays the to-be-played multimedia stream by decoding the to-be-decoded multimedia stream, and performs, when the to-be-played multimedia stream is played to the target event triggering moment, the specified processing corresponding to the target event triggering moment, the target event triggering moment being any one of the at least one event triggering moment.

In some embodiments, the server 200 may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, Content Delivery Networks (CDNs), big data, and artificial intelligence platforms. The terminal 400 may be, but is not limited to, a smartphone, a smartwatch, a laptop, a tablet, a desktop computer, a smart TV, a set-top box, a smart vehicle-mounted device, a portable music player, a personal digital assistant, a specialized messaging device, an intelligent voice interaction device, a portable gaming device, and a smart speaker. The terminal and the server may be directly or indirectly connected in a wired or wireless communication manner. This embodiment of this disclosure does not limit this.

Figure 3:
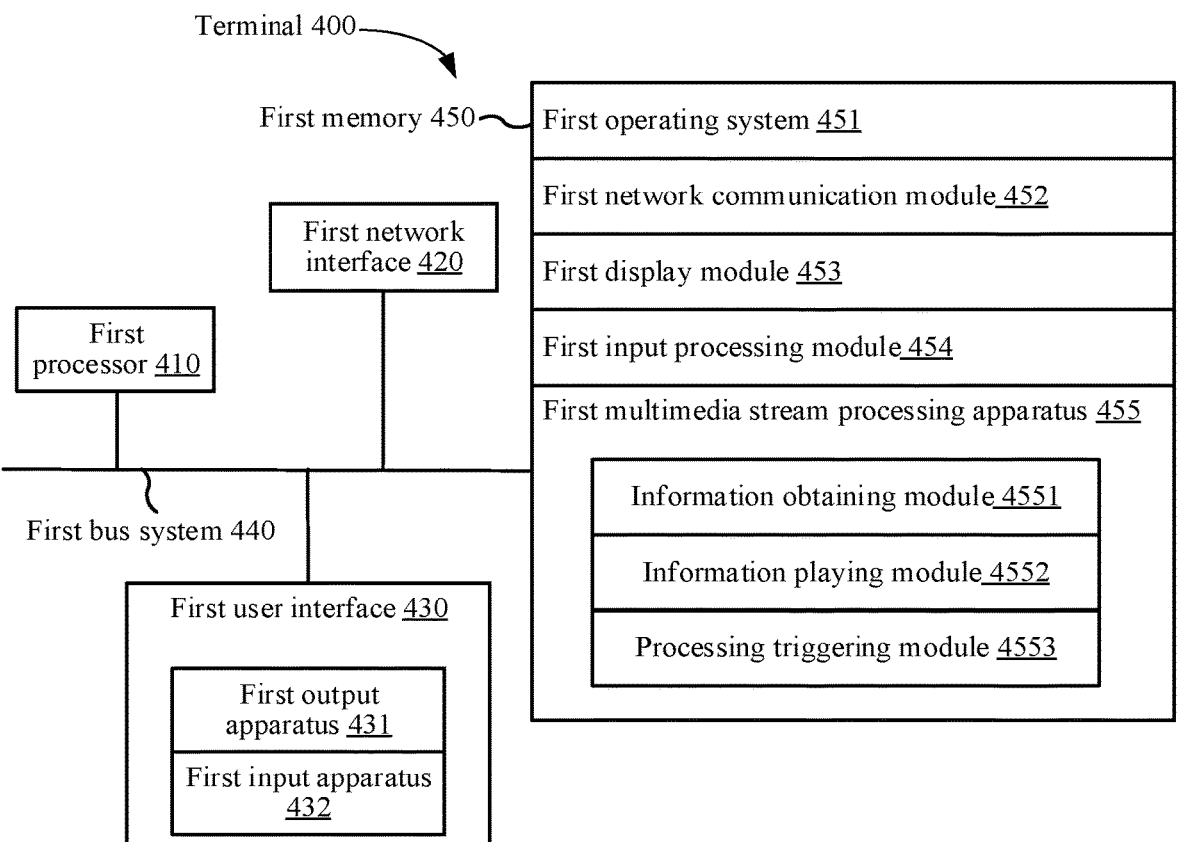
FIG. 3 is a schematic diagram of a structure of a terminal in FIG. 2 according to an embodiment of this disclosure.

FIG. 3 is a schematic diagram of a structure of a terminal in FIG. 2 according to an embodiment of this disclosure. The terminal 400 shown in FIG. 3 includes: at least one first processor 410, a first memory 450, at least one first network interface 420, and a first user interface 430. The various components in the terminal 400 are coupled together by using a first bus system 440. It can be understood that the first bus system 440 is configured to implement connection and communication between the components. In addition to a data bus, the first bus system 440 further includes a power bus, a control bus, and a state signal bus. But, for ease of clear description, all types of buses in FIG. 3 are marked as the first bus system 440.

The first processor 410 may be processing circuitry, including an integrated circuit chip having a signal processing capability, such as a general purpose processor, a Digital Signal Processor (DSP), or other programmable logic devices, a discrete gate or transistor logic device, and a discrete hardware assembly. The general purpose processor may be a microprocessor or any conventional processor, and the like.

The first user interface 430 includes one or more first output apparatuses 431 capable of displaying a media content, including one or more speakers and/or one or more visual display screens. The first user interface 430 further includes one or more input apparatuses 432, including a user interface component helpful to typing, such as a keyboard, a mouse, a microphone, a touch display screen, a camera, other input buttons, and a control.

The first memory 450 may be removable, unremovable, or another combination. An exemplary hardware device includes a solid-state memory, a hard disk drive, an optical disk drive, and the like. The first memory 450 alternatively includes one or more storage devices away from the first processor 410 in physical positions.

The first memory 450 may be a volatile memory or a non-volatile memory, or may include both a volatile memory and a non-volatile memory. For example, the non-volatile memory may be a read only memory (ROM), and the volatile memory may be a random access memory (RAM). The first memory 450 described in this embodiment of this disclosure aims to include any other suitable type of memories.

In some embodiments, the first memory 450 can store data to support various operations. Examples of the data include a program, a module, and a data structure or other subsets or supersets, which are exemplified below.

A first operating system 451 includes a system program used for processing various basic system services and performing hardware-related tasks, for example, a framework layer, a core library layer, a drive layer, and the like, to implement various basic services and process hardware-based tasks.

A first network communication module 452 is configured to reach other electronic devices via one or more (wired or wireless) first network interfaces 420. Exemplarily, the first network interfaces 420 include: Bluetooth, Wi-Fi, Universal Serial Bus (USB), and the like.

A first display module 453 is configured to display information via the one or more first output apparatuses 431 (for example, a display screen and speaker) associated with the first user interface 430 (for example, a user interface used for operating peripheral devices and displaying contents and information).

A first input processing module 454 is configured to detect one or more user inputs or interactions from the one or more first input apparatuses 432 and translate the detected inputs or interactions.

In some embodiments, the first multimedia stream processing apparatus provided by this embodiment of this disclosure may be implemented in software. FIG. 3 shows the first multimedia stream processing apparatus 455 stored in the first memory 450, which can be software in the form of a program and a plug-in, including following software modules: an information obtaining module 4551, an information playing module 4552, and a processing triggering module 4553. These modules are logic, so that they can be combined in various manners or further divided according to functions achieved. Exemplary functions of the various modules will be explained below.

Figure 4:
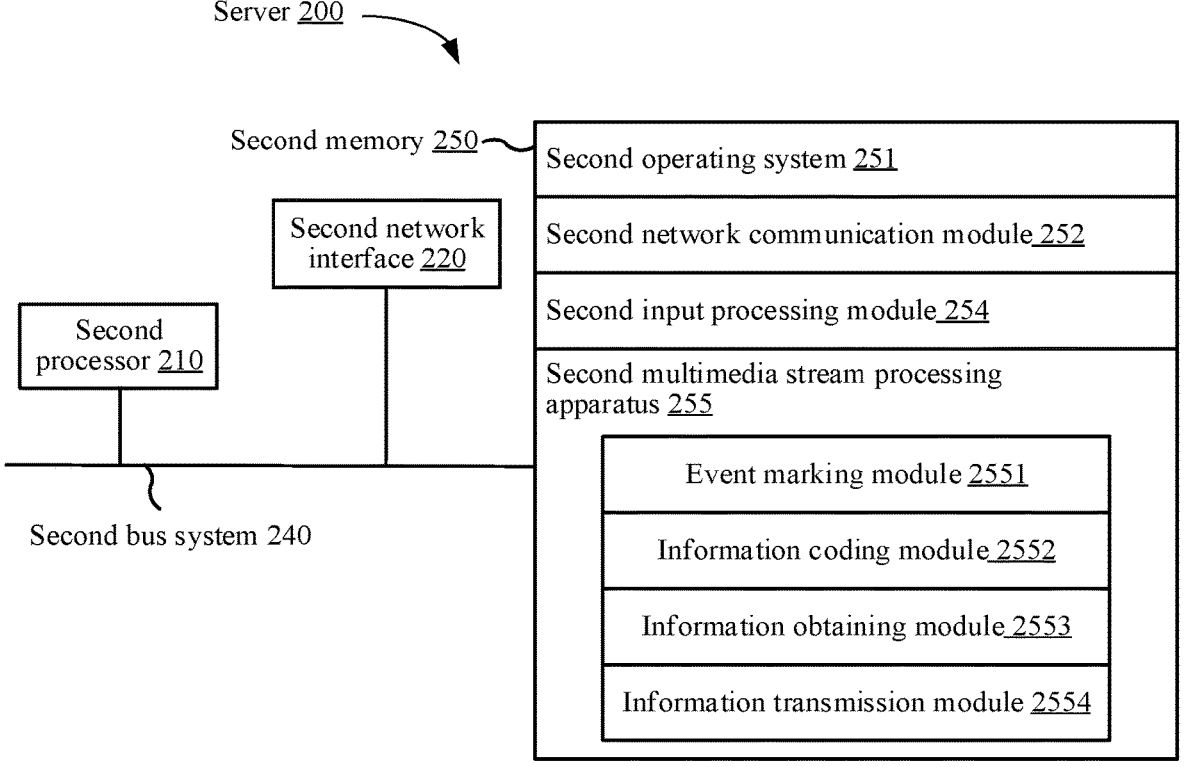
FIG. 4 is a schematic diagram of a structure of a server in FIG. 2 according to an embodiment of this disclosure.

Referring to FIG. 4, FIG. 4 is a schematic diagram of a structure of a server in FIG. 2 according to an embodiment of this disclosure. The server 200 shown in FIG. 4 includes: at least one second processor 210, a second memory 250, at least one second network interface 220. The various components in the server 200 are coupled together by using a second bus system 240. It may be understood that the second bus system 240 is configured to implement connection and communication between these components. In addition to a data bus, the second bus system 240 further includes a power bus, a control bus, and a state signal bus. But, for ease of clear description, all types of buses in FIG. 4 are marked as the second bus system 240.

The second processor 210 may be processing circuitry, including an integrated circuit chip having a signal processing capability, such as a general purpose processor, a DSP, or other programmable logic devices, a discrete gate or transistor logic device, and a discrete hardware assembly. The general purpose processor may be a microprocessor or any conventional processor, and the like.

The second memory 250 may be removable, unremovable, or another combination. An exemplary hardware device includes a solid-state memory, a hard disk drive, an optical disk drive, and the like. The second memory 250 alternatively includes one or more storage devices away from the second processor 210 in physical positions.

The second memory 250 may be a volatile memory or a non-volatile memory, or may include both a volatile memory and a non-volatile memory. For example, the non-volatile memory may be a ROM, and the volatile memory may be a RAM. The second memory 250 described in this embodiment of this disclosure aims to include any other suitable type of memories.

In some embodiments, the second memory 250 can store data to support various operations. Examples of the data include a program, a module, and a data structure or other subsets or supersets, which are exemplified below.

A second operating system 251 includes a system program used for processing various basic system services and performing hardware-related tasks, for example, a framework layer, a core library layer, a drive layer, and the like, to implement various basic services and process hardware-based tasks.

A second network communication module 252 is configured to reach other electronic devices via one or more (wired or wireless) second network interfaces 220. Exemplarily, the second network interfaces 220 include: Bluetooth, Wi-Fi, USB, and the like.

A second input processing module 254 is configured to detect one or more user inputs or interactions from the one or more second input apparatuses and translate the detected inputs or interactions.

In some embodiments, the second multimedia stream processing apparatus provided by this embodiment of this disclosure may be implemented in software. FIG. 4 shows the second multimedia stream processing apparatus 255 stored in the second memory 250, which can be software in the form of a program and a plug-in, including following software modules: an event marking module 2551, an information coding module 2552, a time obtaining module 2553, and an information transmission module 2554. These modules are logic, so that they can be combined in various manners or further divided according to functions achieved. The functions of the various modules will be explained below.

In some embodiments, the first and second multimedia stream processing apparatuses according to the embodiments of this disclosure may also be implemented in hardware. For example, the first and second multimedia stream processing apparatuses according to the embodiments of this disclosure may be processors in the form of a hardware decoding processor, and are programmed to implement a multimedia stream processing method provided by the embodiments of this disclosure. For example, processing circuitry, such as the processor in the form of a hardware decoding processor, may use one or more application-specific integrated circuits (ASICs), a DSP, a programmable logic device (PLD), a complex programmable logic device (CPLD), a field-programmable gate array (FPGA), or other electronic elements.

In some embodiments, the terminal or server may implement the multimedia stream processing method provided in this embodiment of this disclosure by running a computer program. For example, the computer program may be a native program or software module in an operating system. The computer program may be a native application (APP), which cannot be run until it is installed in the operating system, for example, a livestreaming APP or an instant messaging APP. The computer program may also be a mini program, which can be run after being simply downloaded to a browser environment. The computer program may also be a mini program that can be embedded into any APP. In summary, the above computer program can be any form of application program, module, or plug-in.

The multimedia stream processing methods provided by the embodiments of this disclosure will be described below in combination with exemplary applications and implementations of the player device and the server device provided by the embodiments of this disclosure. In addition, the multimedia stream processing methods provided in the embodiments of this disclosure may be applied to various scenarios such as a cloud technology, artificial intelligence, intelligent transportation, and vehicles.

Figure 5A:
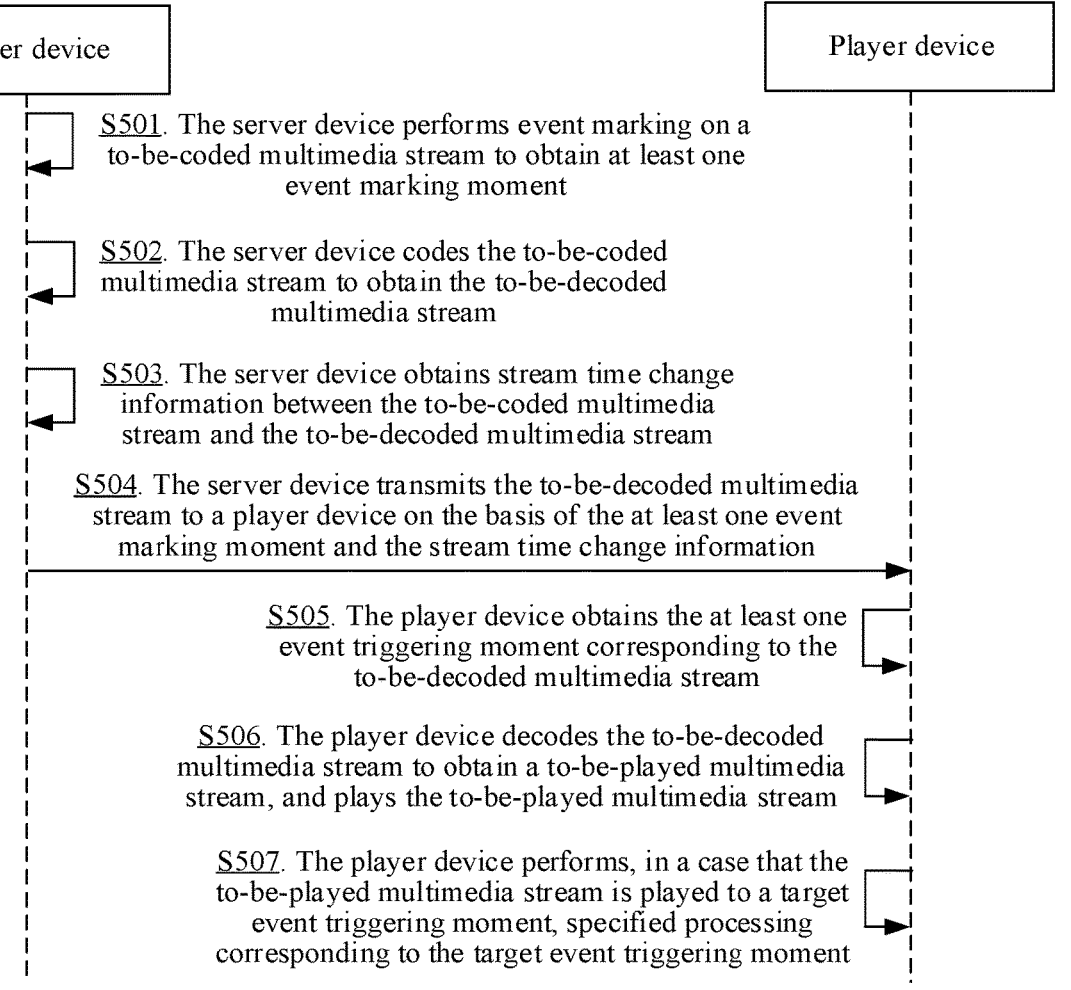
FIG. 5a is a flowchart of a multimedia stream processing method provided according to an embodiment of this disclosure.

FIG. 5a is a first flowchart of a multimedia stream processing method according to an embodiment of this disclosure. The method will be described in combination with steps shown in FIG. 5a.

In step S501, a server device performs event marking on a to-be-coded multimedia stream (or multimedia stream) to obtain at least one event marking moment. In an example, event marking is performed on a content stream to obtain first trigger timing information of a target event in the content stream.

In this embodiment of this disclosure, the server device includes a function used for marking an event. Therefore, in order to trigger specified processing in a player device on the basis of an event in a multimedia stream, the server device performs the event marking on the to-be-coded multimedia stream before coding, so as to mark at least one event marking moment corresponding to at least one event in the to-be-coded multimedia stream.

The to-be-coded multimedia stream is a piece of multimedia information, including at least one of an audio stream and a video stream. It may be a live stream or an on-demand stream. This embodiment of this disclosure does not limit this. Each event in the at least one event is an event in the to-be-coded multimedia stream. The at least one event may be of the same type (for example, events corresponding to big moments such as a continuous virtual kill event in a game scene and a goal event, where the continuous virtual kill event is a "virtual penta kill" event in the game scene), or may be of different types (for example, a virtual kill event and an event of controlling a virtual object of the other party). This embodiment of this disclosure does not limit this. The at least one event corresponds to the at least one event marking moment on a one-to-one basis, so that each event marking moment is a moment at which an event in the to-be-coded multimedia stream occurs, and a time axis of the at least one event marking moment is the same as a time axis of the to-be-coded multimedia stream. When the server device includes an event marking device, the server device may achieve event marking processing through the event marking device.

In step S502, the server device codes the to-be-coded multimedia stream to obtain the to-be-decoded multimedia stream (or a coded multimedia stream). In an example, the content stream is coded to obtain a coded content stream.

In this embodiment of this disclosure, the server device further includes a function used for coding. Therefore, the server device codes the to-be-coded multimedia stream before transmitting the same to the player device, so as to improve the transmission efficiency. An obtained coding result is the to-be-decoded multimedia stream. That is, the to-be-decoded multimedia stream is a to-be-coded multimedia stream after coding. The to-be-decoded multimedia stream corresponds to to-be-coded multimedia information, and is also a piece of multimedia information including at least one of an audio stream and a video stream. When the server device also includes a coding device, the server device may achieve coding processing through the coding device.

The coding processing and the event marking processing are performed in no particular order. The coding processing may be performed first before the event marking processing, or the event marking processing may be performed first before the coding processing, or the coding processing and the event marking processing may be performed in parallel. This embodiment of this disclosure is not limited to this. FIG. 5a shows only an exemplary execution order. For example, in a livestreaming scene, the event marking processing and the coding processing may be performed in sequence.

In this embodiment of this disclosure, when the server device may also include a multimedia stream distribution device, the server device may transmit the to-be-coded multimedia stream to the coding device and the event marking device respectively through the multimedia stream distribution device, so as to enable the coding device to achieve the coding processing and enable the event marking device to achieve the event marking processing. S502 may be triggered through the following processing: The server device receives a playing request transmitted by the player device, and executes S502 in response to the playing request.

In step S503, the server device obtains stream time change information between the to-be-coded multimedia stream and the to-be-decoded multimedia stream. In an example, stream time change information that indicates a timing change between the coded content stream and the content stream is obtained.

In this embodiment of this disclosure, the server device also records a time change of the to-be-decoded multimedia stream relative to the to-be-coded multimedia stream in the process of obtaining the to-be-decoded multimedia stream, and determines the recorded time change of the to-be-decoded multimedia stream relative to the to-be-coded multimedia stream as the stream time change information between the to-be-coded multimedia stream and the to-be-decoded multimedia stream.

The stream time change information may be a time variation between the to-be-coded multimedia stream and the to-be-decoded multimedia stream, or may be a moment of target frame information in the to-be-coded multimedia stream, a moment of the target frame information in the to-be-decoded multimedia stream, and the like. This embodiment of this disclosure does not limit this. The target frame information may be frames having same contents in the to-be-coded multimedia stream and the to-be-decoded multimedia stream, such as a first frame, an end frame, a first frame or an end frame of a specified clip, and the like. The server device may obtain the stream time change information through the coding device.

In step S504, the server device transmits the to-be-decoded multimedia stream to a player device on the basis of the at least one event marking moment and the stream time change information. In an example, the coded content stream is transmitted based on the first trigger timing information and the stream time change information, second trigger timing information of the target event in the coded content stream being determined based on the first trigger timing information and the stream time change information.

In this embodiment of this disclosure, the server device may transmit the at least one event marking moment, the stream time change information, and the to-be-decoded multimedia stream to the player device to cause the player device to determine at least one event triggering moment based on at least one event triggering moment on the basis of the at least one event marking moment and the stream time change information. The server device may also determine the at least one event triggering moment on the basis of the at least one event marking moment and the stream time change information, and transmit the at least one event triggering moment and the to-be-decoded multimedia stream to the player device. This embodiment of this disclosure does not limit this.

The server device obtains the at least one event marking moment and the stream time change information to obtain the at least one event triggering moment corresponding to at least one event in the to-be-decoded multimedia stream. The processing of obtaining the at least one event triggering moment on the basis of the at least one event marking moment and the stream time change information can be executed by either the server device or the player device. This embodiment of this disclosure does not limit this. After the server device transmits the to-be-decoded multimedia stream to the player device, the player device also receives the to-be-decoded multimedia stream.

In step S505, the player device obtains the at least one event triggering moment corresponding to the to-be-decoded multimedia stream. In an example, second trigger timing information of the coded content stream is obtained, the second trigger timing information being determined based on first trigger timing information of the content stream and stream time change information, the stream time change information indicating a timing change between the coded content stream and the content stream, and the first trigger timing information indicating a target event in the content stream.

The at least one event triggering moment is obtained by adjusting the at least one event marking moment on the basis of the stream time change information. The stream time change information refers to a time change before and after the coding of the multimedia stream coding, and each event marking moment refers to an event moment in a multimedia stream before coding. The multimedia stream before coding is the to-be-coded multimedia stream. If the server device transmits the at least one event marking moment and the stream time change information to the player device, the player device will receive the at least one event marking moment and the stream time change information. Therefore, the player device may determine the at least one event triggering moment on the basis of the at least one event marking moment and the stream time change information. If the server device transmits the at least one event triggering moment to the player device, the player device will receive the at least one event triggering moment. That is, the player device may adjust the at least one event marking moment by using the stream time change information to obtain the at least one event triggering moment, or may obtain the at least one event triggering moment by receiving the at least one event triggering moment transmitted by the server device. This embodiment of this disclosure does not limit this.

In step S506, the player device decodes the to-be-decoded multimedia stream to obtain a to-be-played multimedia stream, and plays the to-be-played multimedia stream. In an example, the coded multimedia stream is decoded.

In this embodiment of this disclosure, the player device decodes the received to-be-decoded multimedia stream to obtain the to-be-played multimedia stream, and plays the to-be-played multimedia stream.

The to-be-played multimedia stream is a decoding result of the to-be-decoded multimedia stream, which is a to-be-decoded multimedia stream after decoding. Due to different coding manners, the to-be-played multimedia stream may be the same as or different from the to-be-coded multimedia stream. This embodiment of this disclosure does not limit this.

In step S507, the player device performs, in a case that the to-be-played multimedia stream is played to a target event triggering moment, specified processing corresponding to the target event triggering moment. In an example, when the decoded content stream is played to the target event indicated by the second trigger timing information, specified processing corresponding to the target event is performed.

In this embodiment of this disclosure, in the process that the player device plays the to-be-played multimedia stream, if the to-be-played multimedia stream is played to any event triggering moment among the at least one event triggering moment, it indicates that what is currently played in the player device is a content of one event (for example, at least one of a picture and an audio). At this time, the specified processing at the event triggering moment is triggered, so that the playing of the content of the event is synchronized with the triggering of the specified processing. The target event triggering moment is any one of the at least one event triggering moment.

The server device transmits the to-be-decoded multimedia stream to the player device on the basis of the at least one event marking moment and the stream time change information, so that the player device plays the to-be-played multimedia stream by decoding the to-be-decoded multimedia stream, and executes, in a case that the to-be-played multimedia stream is played to the target event triggering moment, the specified processing corresponding to the target event triggering moment.

Figure 5B:
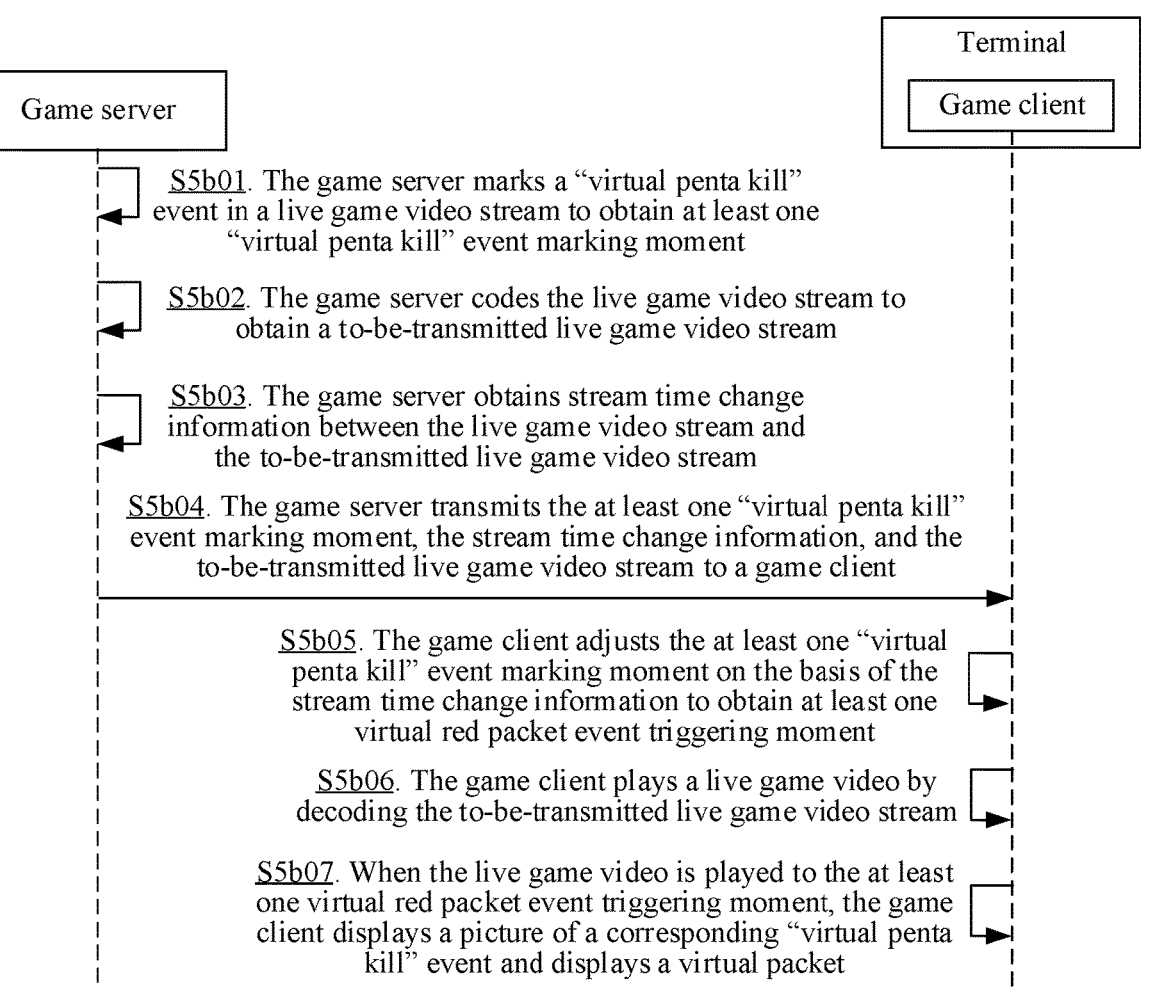
FIG. 5b is a flowchart of an exemplary multimedia stream processing method according to an embodiment of this disclosure.

For example, referring to FIG. 5*b*, FIG. 5*b* is a flowchart of an exemplary multimedia stream processing method according to an embodiment of this disclosure. The exemplary multimedia stream processing method describes a process that a game server (referred to as a server device) transmits a live game video stream (referred to as a to-be-coded multimedia stream) to a game client on a terminal (referred to as a client device), and a process that the client device plays the received live game video stream and presents a virtual red packet (referred to as specified processing) when playing a picture of an "virtual penta kill" event (referred to as a target event). The method will be described below in combination with steps shown in FIG. 5*b*.

In step S5*b*01, a game server marks a "virtual penta kill" event in a live game video stream to obtain at least one "virtual penta kill" event marking moment.

The live game video stream is the to-be-coded multimedia stream in this embodiment of this disclosure. The process of marking the "virtual penta kill" event is an event marking process. The obtained at least one "virtual penta kill" event marking moment corresponds to the at least one event marking moment in this embodiment of this disclosure.

In step S5*b*02, the game server codes the live game video stream to obtain a to-be-transmitted live game video stream.

The to-be-transmitted live game video stream is the to-be-decoded multimedia stream.

In step S5*b*03, the game server obtains stream time change information between the live game video stream and the to-be-transmitted live game video stream.

The process of obtaining the stream time change information between the live game video stream and the to-be-transmitted live game video stream is the process of obtaining the stream time change information between the to-be-coded multimedia stream and the to-be-decoded multimedia stream in this embodiment of this disclosure.

In step S5*b*04, the game server transmits the at least one "virtual penta kill" event marking moment, the stream time change information, and the to-be-transmitted live game video stream to a game client.

Explanation is made by taking processing of adjusting execution time of the game client.

In step S5*b*05, the game client adjusts the at least one "virtual penta kill" event marking moment on the basis of the stream time change information to obtain at least one virtual red packet event triggering moment.

If the game server transmits the at least one "virtual penta kill" event marking moment, the stream time change information, and the to-be-transmitted live game video stream to the game client, the game client will receive the at least one "virtual penta kill" event marking moment, the stream time change information, and the to-be-transmitted live game video stream transmitted by the game server. At this time, the game client adjusts each "virtual penta kill" event marking moment on the basis of the stream time change information to obtain each corresponding virtual red packet event triggering moment. The at least one virtual red packet event triggering moment is the at least one event triggering moment in this embodiment of this disclosure.

In step S5b06, the game client plays a live game video by decoding the to-be-transmitted live game video stream.

The process that the game client plays the live game video is the process that the server device plays the to-be-played multimedia stream.

In step S5b07, when the live game video is played to the at least one virtual red packet event triggering moment, the game client displays a picture of a corresponding "virtual penta kill" event and displays a virtual packet.

When the live game video is played to the at least one virtual red packet event triggering moment, that is, when the to-be-played multimedia stream is played to the target event triggering moment, the specified processing performed by the game client is displaying the virtual red packet. Since the game client device adjusts each "virtual penta kill" event marking moment on the basis of the stream time change information, a playing moment of the picture of the "virtual penta kill" event is consistent with the adjusted "virtual penta kill" event marking moment (namely, the virtual red packet event triggering moment). Therefore, it is possible to achieve synchronous displaying of the picture of the "virtual penta kill" event and the virtual red packet, improving the game video playing effect.

It can be understood that among the at least one event triggering moment obtained by the player device, each event triggering moment is obtained by adjusting the at least one event marking moment on the basis of the stream time change information, and the stream time change information refers to the time change before and after the coding of the multimedia stream. Therefore, each event triggering moment obtained by the player device is a moment at which an event in a to-be-decoded live stream occurs. In this way, in the process of playing the to-be-played multimedia stream obtained by decoding the to-be-decoded multimedia stream, a played content matches the event triggering moment. Accordingly, if any event triggering moment to which the to-be-played multimedia stream is played is just a moment of playing the event content, at this time, the specified processing is triggered, so that the accuracy of triggering specified processing can be improved.

Figures 6A, 6B:
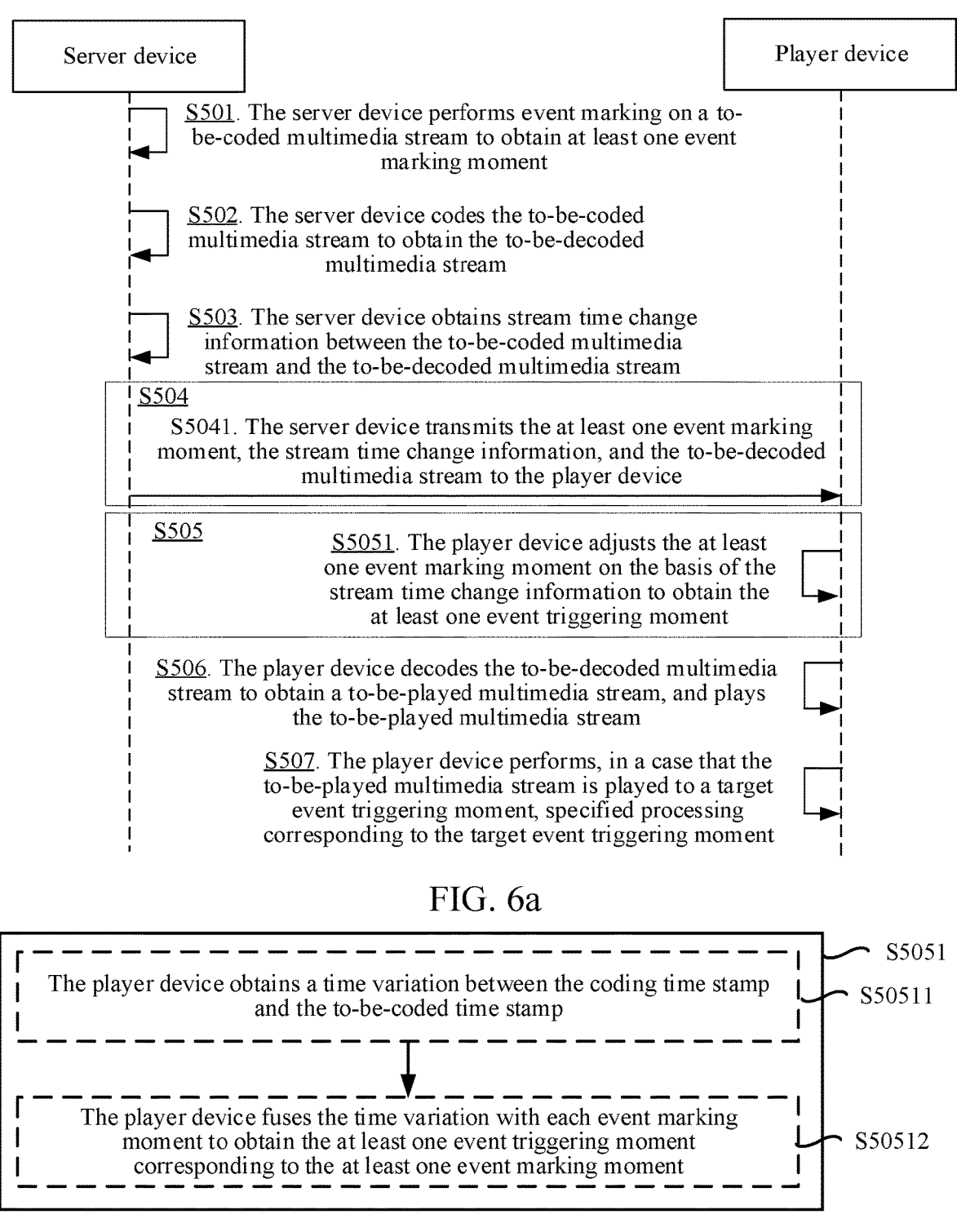
FIG. 6a is a flowchart of a multimedia stream processing method provided according to an embodiment of this disclosure.
FIG. 6b is a flowchart of adjusting at least one event marking moment according to an embodiment of this disclosure.

FIG. 6a is a second flowchart of a multimedia stream processing method provided according to an embodiment of this disclosure. As shown in FIG. 6a, in this embodiment of this disclosure, S504 may be implemented by S5041. That is, the server device transmits the to-be-decoded multimedia stream to the player device on the basis of the at least one event marking moment and the stream time change information, including S5041. This step will be explained below.

In step S5041, the server device transmits the at least one event marking moment, the stream time change information, and the to-be-decoded multimedia stream to the player device.

In this embodiment of this disclosure, if the server device transmits the at least one event marking moment and the stream time change information to the player device, the player device will receive the stream time change information and the at least one event marking moment transmitted by the server device.

The server device may include a broadcasting service device. At this time, the server device may broadcast the at least one event marking moment to each player device through the broadcasting service device. The server device also includes a playing service device. Each player device requests the corresponding coding device to code the to-be-coded multimedia stream through the playing service device, and obtains, through the playing service device, the to-be-decoded multimedia stream coded by the corresponding coding device and the stream time change information of the to-be-decoded multimedia stream relative to the to-be-coded multimedia stream.

Correspondingly, in this embodiment of this disclosure, S505 may be implemented through S5051. That is, the player device obtains the at least one event triggering moment corresponding to the to-be-decoded multimedia stream, including S5051. This step will be explained below.

In step S5051, the player device adjusts the at least one event marking moment on the basis of the stream time change information to obtain the at least one event triggering moment.

In this embodiment of this disclosure, the player device adjusts at least one actually marked event marking moment using the stream time change information to be consistent with a change in the time axis of the to-be-coded multimedia stream in the coding process, so that the time axis of at least one adjusted event triggering moment is consistent with the time axis of the to-be-decoded multimedia stream.

FIG. 6b is a flowchart of adjusting at least one event marking moment according to an embodiment of this disclosure. As shown in FIG. 6b, in this embodiment of this disclosure, the stream time change information includes a to-be-coded time stamp and a coding time stamp of target frame information. At this time, S5051 may be implemented through S50511 and S50512. That is, the player device adjusts the at least one event marking moment on the basis of the stream time change information to obtain the at least one event triggering moment, including S50511 and S50512. The various steps will be explained separately below.

In step S50511, the player device obtains a time variation between the coding time stamp and the to-be-coded time stamp.

Both the to-be-coded multimedia stream and the to-be-decoded multimedia stream include the target frame information. The to-be-coded time stamp is a time stamp corresponding to the target frame information in the to-be-coded multimedia stream, and the to-be-coded time stamp is a time stamp corresponding to the target frame information in the to-be-decoded multimedia stream. The target frame information is frame information containing a same multimedia content in the to-be-coded multimedia stream and the to-be-decoded multimedia stream, and the time variation refers to a relative time difference between the coding time stamp and the to-be-coded time stamp.

In step S50512, the player device fuses the time variation with each event marking moment to obtain the at least one event triggering moment corresponding to the at least one event marking moment.

In this embodiment of this disclosure, the player device applies the obtained time variation to each event marking moment, to adaptively adjust each event marking moment on the basis of a time stamp change of the to-be-coded multimedia stream in the coding process, so that each event triggering moment obtained through adjustment corresponds to an event content in the to-be-decoded multimedia stream. Fusing, by the player device, the time variation with each event marking moment may be achieved by performing addition or offsetting each event marking moment on the basis of the time variation. This embodiment of this disclosure does not limit this.

It can be understood that the server device records the time stamps of the target frame information in the multimedia streams before and after coding (the to-be-coded multimedia stream is a multimedia stream before coding and the to-be-decoded multimedia stream is a multimedia stream after coding), and transmits the two recorded time stamps to the player device to cause the player device to adaptively adjust each received event marking moment to obtain the at least one event triggering moment with the time axis consistent with the time axis of the to-be-decoded multimedia stream. In this way, the consistency between an event content and an event playing moment in an actual playing process can be improved, thereby improving the accuracy of triggering a specified event.

Figure 7A:
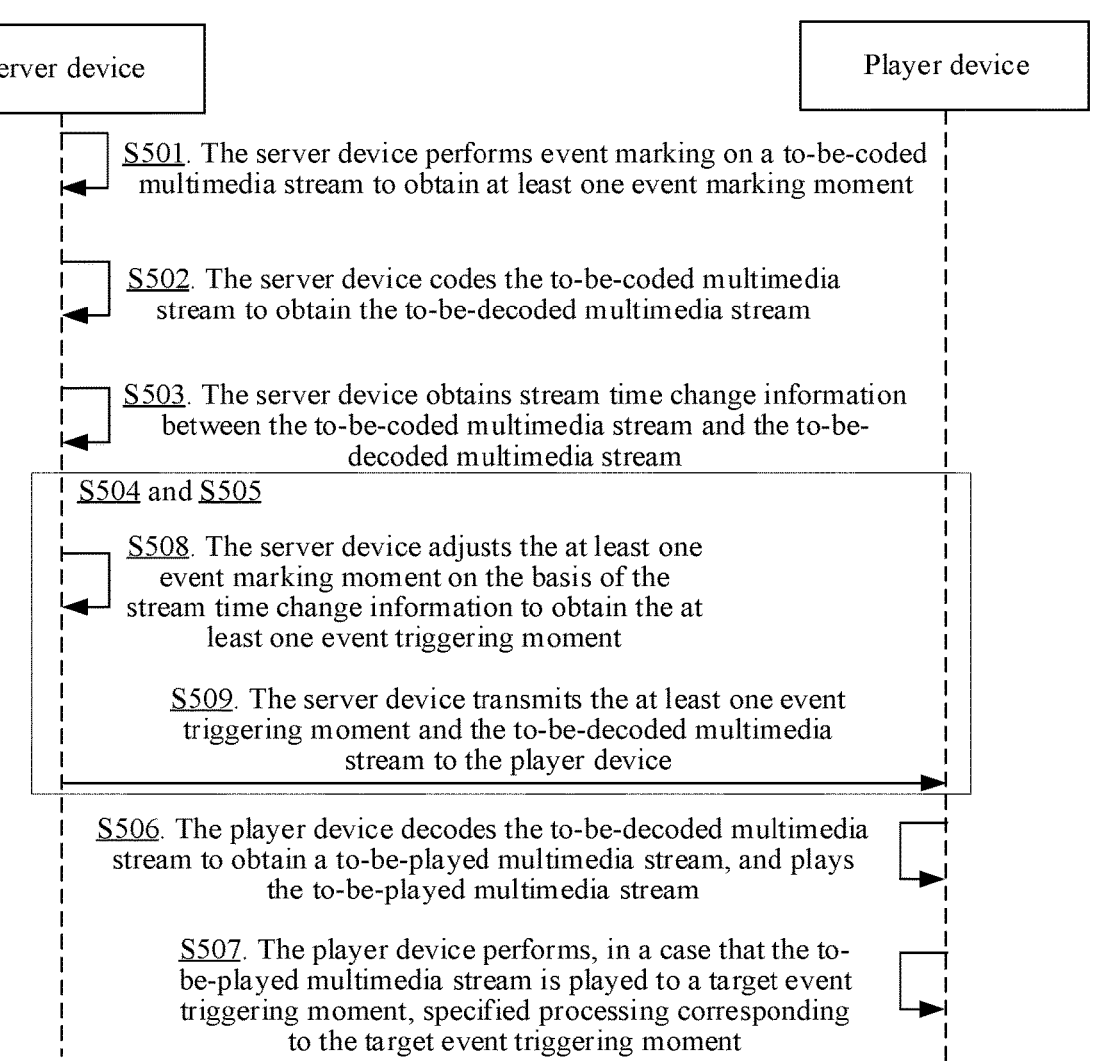
FIG. 7a is a flowchart of a multimedia stream processing method provided according to an embodiment of this disclosure.

FIG. 7a is a third flowchart of a multimedia stream processing method provided according to an embodiment of this disclosure. As shown in FIG. 7a, in this embodiment of this disclosure, S504 and S505 may be implemented by S508 and S509. That is, the server device transmits the to-be-decoded multimedia stream to the player device on the basis of the at least one event marking moment and the stream time change information, including S508 and S509. The various steps will be explained below.

In step S508, the server device adjusts the at least one event marking moment on the basis of the stream time change information to obtain the at least one event triggering moment.

The server device adjusts the at least one event marking moment on the basis of the stream time change information to obtain the at least one event triggering moment. For example, if the stream time change information includes the to-be-coded time stamp and the coding time stamp of the target frame information, the server device obtains the time variation between the coding time stamp and the to-be-coded time stamp, and fuses the time variation with each event marking moment to obtain the at least one event triggering moment corresponding to the at least one event marking moment. The corresponding adjustment process is similar to the processing process described in S50511 and S50512, but an executive body is different.

In step S509, the server device transmits the at least one event triggering moment and the to-be-decoded multimedia stream to the player device.

In this embodiment of this disclosure, after the server device adjusts the at least one event marking moment on the basis of the stream time change information to obtain the at least one event triggering moment, the server device transmits the at least one event triggering moment and the to-be-decoded multimedia stream to the player device. If the server device transmits the at least one event triggering moment to the player device, the player device will receive the at least one event triggering moment transmitted by the server device and corresponding to the to-be-decoded multimedia stream. Furthermore, the at least one event triggering moment is obtained by adjusting, by the server device, the at least one event marking moment on the basis of the stream time change information.

If the server device includes an event marking device, a broadcasting device, a coding device, and a playing service device, the playing service device obtains the at least one event marking moment from the event marking device through the broadcasting device, obtains the stream time change information and the to-be-decoded multimedia streams from the coding device, adjusts the at least one event marking moment into the at least one event triggering moment on the basis of the stream time change information, and transmits the to-be-decoded multimedia stream and the at least one event triggering moment to the player device.

It can be understood that by adjusting the at least one event marking moment in the server device, the resource consumption of the player device for adjusting the at least one event marking moment can be reduced. Compared to the performance of the player device, the performance of the server device is better. By implementing the adjustment processing through the server device, the adjustment efficiency can be improved, thereby improving the multimedia stream processing efficiency. In addition, compared with separately adjusting the at least one event marking moment by a plurality of player devices, adjusting the at least one event marking moment by the server device can reduce the adjustment load and achieve multiplexing of an adjustment result, thereby reducing the resource consumption for processing the multimedia stream.

In this embodiment of this disclosure, the specified processing in S507 includes at least one of displaying virtual resource information, displaying a specified special effect, inter-cutting multimedia information, displaying question-and-answer information, and displaying recommendation information.

The virtual resource information includes at least one of a virtual resource packet and a virtual gift. The player device performs, in a case that the specified processing includes displaying virtual resource information, the specified processing corresponding to the target event triggering moment, which includes: The player device displays the virtual resource information in a case that the target event triggering moment refers to a moment at which a virtual scene event occurs. Moreover, after the player device displays the virtual resource packet, the multimedia stream processing method further includes: the player device displays an obtained target virtual resource, such as an opened virtual red packet and a grabbed virtual gift, in response to a triggering operation performed on the virtual resource packet.

A specified special effect played by the player device may be a special effect associated with at least one event. For example, if the event is a goal event, a special effect of applause is displayed. If the event is a continuous virtual kill event, a special effect of spreading virtual coins. If the event is a game winning streak, an animated special effect of congratulating the winning streak is displayed. Or the like. In addition, if the to-be-played multimedia stream includes subtitle information, the subtitle information associated with the event content may be marked and displayed when a target event is triggered.

The multimedia information inter-cut by the player device is different from the to-be-played multimedia stream, such as advertisements, messages, and announcement information.

After the player device displays interaction information such as question-and-answer information and recommendation information, the multimedia stream processing method further includes: the player device performs, in response to an interaction operation performed on the interaction information, processing corresponding to the interaction operation, for example, application switching and played information switching.

In this embodiment of this disclosure, the event marking in S501 is achieved through at least one of a marking operation, a neural network model, and marker information. The marking operation refers to an operation used for determining an event marking moment. The neural network model is used for determining the event marking moment on the basis of a content of the to-be-played multimedia stream, and the neural network model is trained on the basis of a multimedia stream sample and a marked event moment. The marker information is used for representing the event marking moment, and may be information carried in the to-be-coded multimedia stream.

FIG. 7b is a schematic diagram of obtaining stream time change information according to an embodiment of this disclosure. As shown in FIG. 7b, in this embodiment of this disclosure, S503 may be implemented through S5031 to S5034. That is, the server device obtains the stream time change information between the to-be-coded multimedia stream and the to-be-decoded multimedia stream, including S5031 to S5034. The various steps will be explained below.

In step S5031, the server device obtains a to-be-coded time stamp corresponding to target frame information of the to-be-coded multimedia stream.

In this embodiment of this disclosure, the coding device in the server device records a time stamp corresponding to the target frame information in the to-be-coded multimedia stream after obtaining the to-be-coded multimedia stream distributed by the multimedia stream distribution device, thereby obtaining the to-be-coded time stamp.

In step S5032, the server device obtains a coding manner of the to-be-decoded multimedia stream.

The coding manner includes any one of a first specified coding manner, a second specified coding manner, and a third specified coding manner. The first specified coding manner refers to a manner of not changing a presentation time stamp in the coding process. The second specified coding manner refers to a manner of determining a presentation time stamp on the basis of synchronizing time information (such as time information provided by a synchronous clock) in the coding process. The third specified coding manner refers to a manner of determining a presentation time stamp on the basis of specified time information (such as 0 milliseconds) in the coding process.

In step S5033, the server device determines a coding time stamp of the target frame information in the to-be-decoded multimedia stream on the basis of the coding manner.

In this embodiment of this disclosure, the to-be-coded time stamp is determined as the coding time stamp of the target frame information in the to-be-decoded multimedia stream in a case that the coding manner is the first specified coding manner A synchronizing time stamp is obtained in a case that the coding manner is the second specified coding manner, and the synchronizing time stamp is determined as the coding time stamp of the target frame information in the to-be-decoded multimedia stream, the synchronizing time stamp being the synchronizing time information. A specified time stamp is determined as the coding time stamp of the target frame information in the to-be-decoded multimedia stream in a case that the coding manner is the third specified coding manner, the specified time stamp being specified time information.

In step S5034, the server device determines the to-be-coded time stamp and the coding time stamp as the stream time change information between the to-be-coded multimedia stream and the to-be-decoded multimedia stream.

The server device transmits the to-be-coded time stamp and the coding time stamp as the stream time change information to the player device to cause the player device to adjust each event marking moment on the basis of the to-be-coded time stamp and the coding time stamp in the stream time change information. Or, the server device may take the to-be-coded time stamp and the coding time stamp as the stream time change information, and adjust each event marking moment on the basis of the to-be-coded time stamp and the coding time stamp in the stream time change information to transmit each event triggering moment to the player device.

In this embodiment of this disclosure, the server device further includes a time stamp synchronization device, configured to forward the stream time change information obtained by the coding device to the playing service device, and also configured to provide the synchronizing time stamp to the coding device to cause the coding device to code the to-be-coded multimedia stream on the basis of the synchronizing time stamp.

An exemplary application of this embodiment of this disclosure in one practical application scenario will be described below. This exemplary application describes that in a game livestreaming process, a terminal (referred to as the player device) accurately triggers displaying of a virtual resource packet (referred to as the specified processing) during playing of audios and videos (referred to as the to-be-played multimedia stream) while playing pictures of excellent events (referred to as the target event triggering moment).

FIG. 8 is a schematic diagram of an exemplary event picture according to an embodiment of this disclosure. As shown in FIG. 8, in a virtual scene 8-1, a virtual object 8-11 has virtually killed five virtual objects of an opposing team within specified time, which triggers the "virtual penta kill" event.

Based on FIG. 8, FIG. 9 is a schematic diagram illustrating that an exemplary time stamp changes according to an embodiment of this disclosure. As shown in FIG. 9, a process of changing a time stamp corresponding to an event in a multimedia stream by coding is described: In a live stream 9-1 before coding, a time stamp 9-11 (referred to as the event marking moment) of the "virtual penta kill" event in FIG. 8 is expressed as PTS_0 in FIG. 9. In a live stream 9-2 (referred to as the event triggering moment) obtained by coding the live stream 9-1, a time stamp 9-21 of the "virtual penta kill" event in FIG. 8 is expressed as PTS_1 in FIG. 9. PTS_0 and PTS_1 correspond to different time. That is, coding will change a time stamp of frame information in a live stream. An event moment (for example, the time stamp 9-11) before coding can be adjusted on the basis of a change between the time stamps before and after coding, so that an adjusted event moment (for example, the time stamp 9-21) more precisely matches an event occurrence moment in the coded live stream. The adjustment process will be described in detail below.

Referring to FIG. 10, FIG. 10 is a schematic diagram of an architecture of a live stream system according to an embodiment of this disclosure. As shown in FIG. 10, when a live stream 10-1 (expressed as a live stream ID_0, referred to as the to-be-coded multimedia stream) reaches a stream distribution server 10-2 (referred to as the multimedia stream distribution device), the stream distribution server 10-2 performs multi-path distribution on the live stream 10-1. In one path, the live stream 10-1 is transmitted to an event management server 10-3 (referred to as the event marking device). In another path, the live stream 10-1 is transmitted to n (n is a positive integer greater than 1) coding servers 10-4 (exemplarily showing a coding server 10-41 to a coding server 10-4n, referred to as the coding device).

The event management server 10-3 performs event marking on the live stream 10-1 to obtain each marked moment on a time axis of the live stream 10-1 (for example, the "virtual penta kill" moment or other exciting moments, referred to as the event marking moment). The event marking may be achieved by receiving an operation of a user (referred to as the marking operation), or may be achieved by artificial intelligence (for example, the neural network model), or may be directly obtained on the basis of indication information transmitted by a game server (for example, information transmitted synchronously with the live stream 10-1, referred to as the marker information). The event management server 10-3 transmits each obtained marking moment to a broadcasting server 10-5 (referred to as the broadcasting device).

The coding servers 10-4 are configured to transmit, when there are differences in the network condition and the playing capability, live streams that best matches a network condition and a playing capability to a terminal of the user, to improve the playing fluency and other playing effects. Each coding server i among the n coding servers 10-4 (i is a positive integer variable greater than or equal to 1 and less than or equal to n, namely, any one of the coding server 10-41 to the coding server 10-4$n$) is configured to code the live stream 10-1 into different live streams (live stream ID_1 to live stream ID_n). Each coding server i among the coding servers 10-4 implements coding on the basis of at least one of different resolutions, coding formats (such as coding format H.265 and coding format H.264), and code rates. In addition, each coding server i may also correspond to one game livestreaming application.

Figure 11:
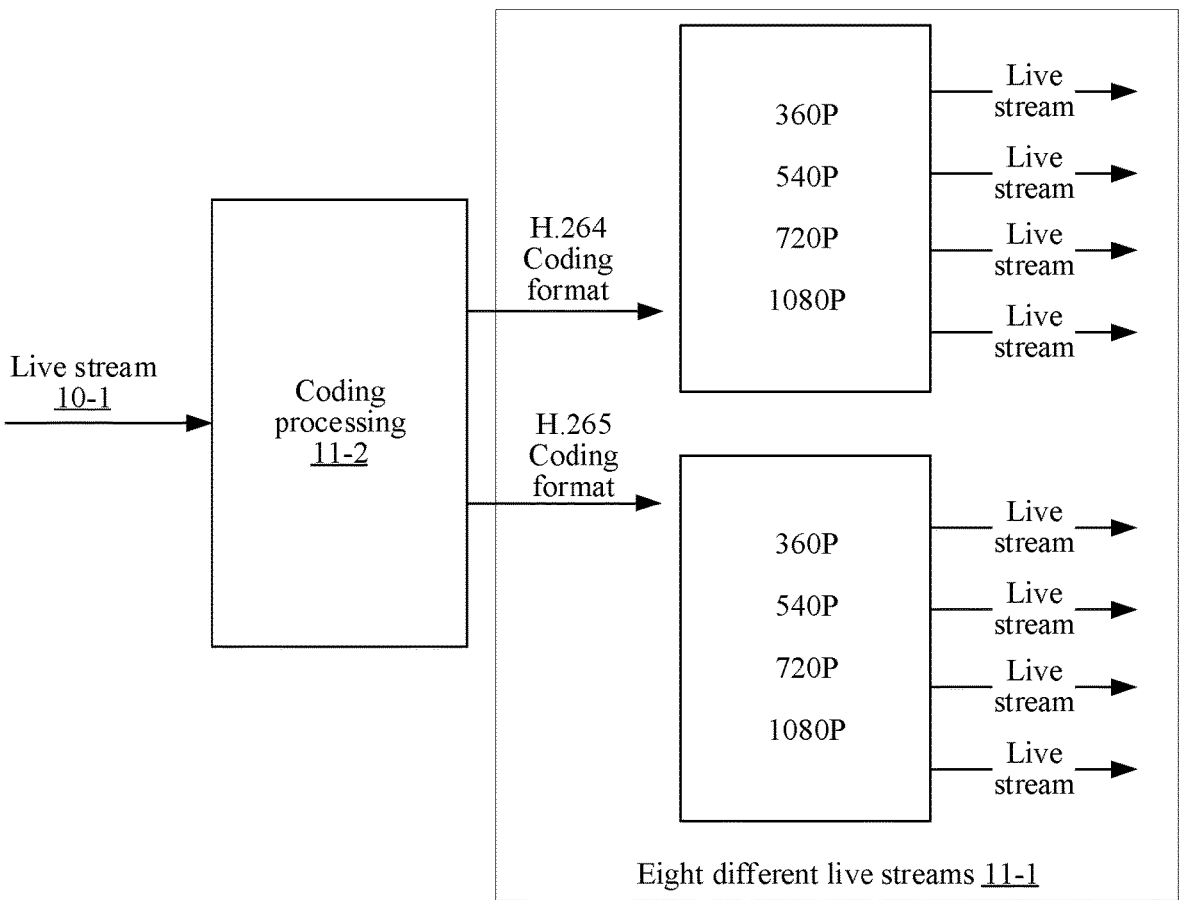
FIG. 11 is a schematic diagram of a coding result of an exemplary live stream according to an embodiment of this disclosure.

For example, FIG. 11 is a schematic diagram of a coding result of an exemplary live stream according to an embodiment of this disclosure. As shown in FIG. 11, eight different live streams 11-1 output by the live stream 10-1 in FIG. 10 subjected to the coding processing 11-2 include a 1080P-definition live stream at a coding format H.265, a 720P-definition live stream at a coding format H.265, a 540P-definition live stream at a coding format H.265, a 360P-definition live stream at a coding format H.265, a 1080P-definition live stream at a coding format H.264, a 720P-definition live stream at a coding format H.264, a 540P-definition live stream at a coding format H.264, and 360P-definition live stream at a coding format H.264.

Figure 12:
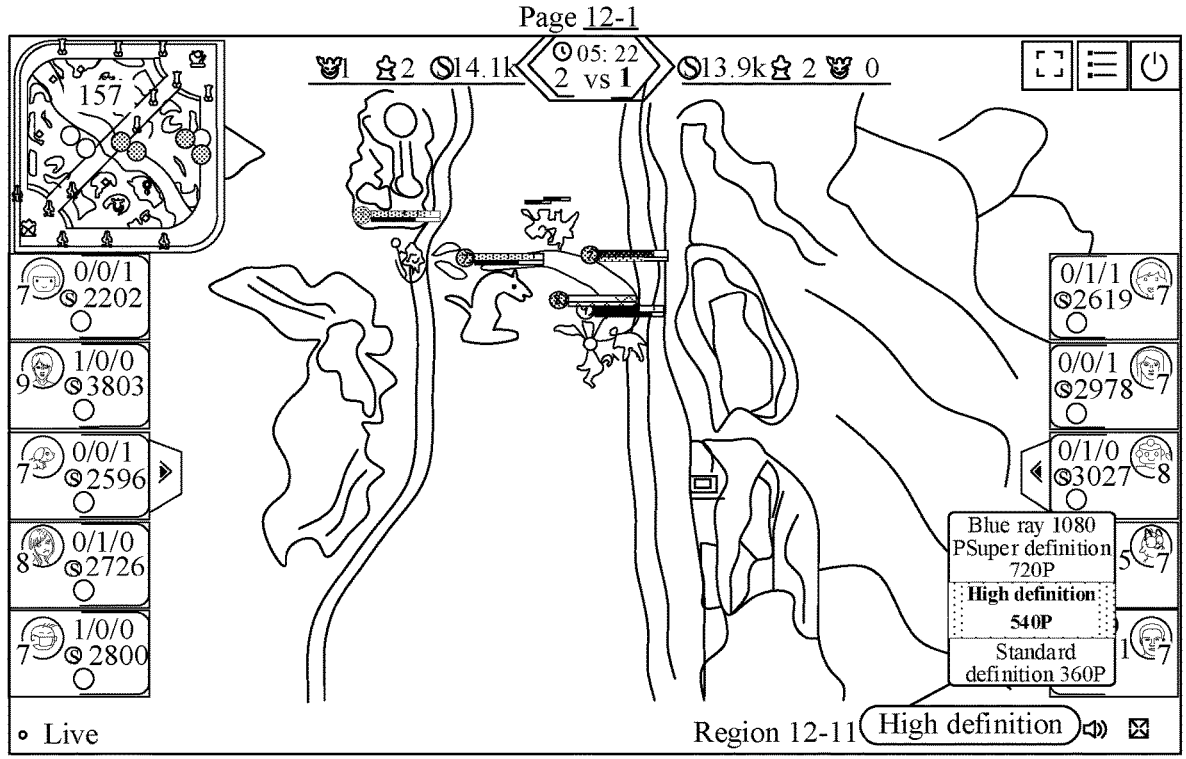
FIG. 12 is a schematic diagram of an exemplary application scenario of obtaining different live streams according to an embodiment of this disclosure.

Based on FIG. 11, FIG. 12 is a schematic diagram of an exemplary application scenario of obtaining different live streams according to an embodiment of this disclosure. As shown in FIG. 12, it can be determined on the basis of a region 12-11 on a page 12-1 that a live stream played on the page 12-1 is a live stream with "high definition of 540P", and a live stream with any definition of "Blue ray 1080P", "super definition 720P", and "standard definition 360P" can be selected for playing. A terminal corresponding to the page 12-1 supports a live stream at the coding format H.264, so "standard definition 360P" displayed on the page 12-1 corresponds to the 360P-definition live stream at the coding format H.264 in FIG. 12; "high definition 540P" displayed on the page 12-1 corresponds to the 540P-definition live stream at the coding format H.264 in FIG. 12; "super definition 720P" displayed on the page 12-1 corresponds to the 720P-definition live stream at the coding format H.264 in FIG. 12; and "Blue ray 1080P" displayed on the page 12-1 corresponds to the 1080P-definition live stream at the coding format H.264 in FIG. 12.

Each coding server i codes the live stream ID_0 to obtain a live stream ID_i. If the coding server i may thoroughly transmit the live stream ID_0, without changing a Presentation Time Stamp (PTS) corresponding to frame information of the live stream ID_0 (corresponding to the first specified coding manner), the live stream ID_i and the live stream ID_0 have the same time axis. Thus, a presentation time stamp PTS_is (referred to as a coding time stamp) corresponding to start frame information (namely, at least one of a first frame of picture and first frame of audio that the live stream ID_0 reaches the coding server i, referred to as the target frame information) of the live stream ID_i is the same as a playing time stamp PTS_i0 (referred to as the to-be-coded time stamp) corresponding to stat frame information of the live stream ID_0. At this time, the marking moment does not change. In addition, the coding server i may also take synchronizing time (referred to as the synchronizing time stamp) provided by a time stamp synchronizing server 10-6 (referred to as the time stamp synchronization device) as the presentation time stamp PTS_is corresponding to the start frame information of the live stream ID_i (corresponding to the second specified coding manner). The coding server i may also set the presentation time stamp PTS_is (corresponding to a specified time stamp, for example, 0) corresponding to the start frame information of the live stream ID_i by self (corresponding to the third specified coding manner). Therefore, in this embodiment of this disclosure, when receiving the live stream ID_0 distributed by the stream distribution server 10-2, the coding server i records the presentation time stamp PTS_i0 corresponding to the start frame information of the live stream ID_0, forms a time stamp pair <PTS_i0, PTS_is> (referred to as the stream time change information) by the presentation time stamp PTS_i0 and the presentation time stamp PTS_is corresponding to the start frame information of the live stream ID_i, and transmits the time stamp pair <PTS_i0, PTS_is> to the time stamp synchronization server 10-6. If i is greater than or equal to 0 and less than or equal to n, outputs corresponding to the coding server 10-41 to the coding server 10-4$n$ are (ID_1, PTS_10, PTS_1s), (ID_2, PTS-20, PTS_2s), . . . , (ID_n, PTS_n0, PTS_ns). Any one of the live stream ID_1 to the live stream ID_n may be transmitted to a terminal 10-7 through distribution by a content distribution network (CDN) or through peer-to-peer (P2P) services.

The broadcast server 10-5 broadcasts each marking moment to the terminal 10-7. The playing server 10-8 (referred to as the playing service device) obtains the time stamp pair <PTS_i0, PTS_is> from the time stamp synchronization server 10-6, and transmits the same to the terminal 10-7. The playing server 10-8 obtains a coded live stream address from the coding server 10-4, and transmits the same to the terminal 10-7. Thus, the terminal 10-7 may adjust each marking moment on the basis of the time stamp pair, and obtain the live stream ID_i from the coding server 10-4 on the basis of the live stream address. For example, if the marking moment is PTS_ID0_t, the marking moment is the moment of the live stream ID_i PTS_IDi_t=PTS_ID0_t+ (PTS_is−PTS_i0). When the terminal plays a content to PTS_IDi_t, a corresponding processing logic is activated, thus triggering the specified processing.

For FIG. 10, the processing process of the live stream includes an information interaction stream (referred to as a time stamp pair interaction processing stream), a live stream processing stream, and an event stream (referred to as a processing stream at the marking moment). A correspondence relationship between time stamps PTS_x0 and PTS_y0 of two pieces of frame information in the live stream ID_0 and time stamps PTS_xi and PTS_yi of two pieces of frame information in the live stream ID_i is as follows: PTS_yi−PTS_xi=PTS_y0−PTS_x0. A live content corresponding to the time stamp PTS_x0 is the same as a live content corresponding to the time stamp PTS_xi, and a live content corresponding to the time stamp PTS_y0 is the same as a live content corresponding to the time stamp PTS_yi.

US 12,594,502 B2

23

Figure 13:
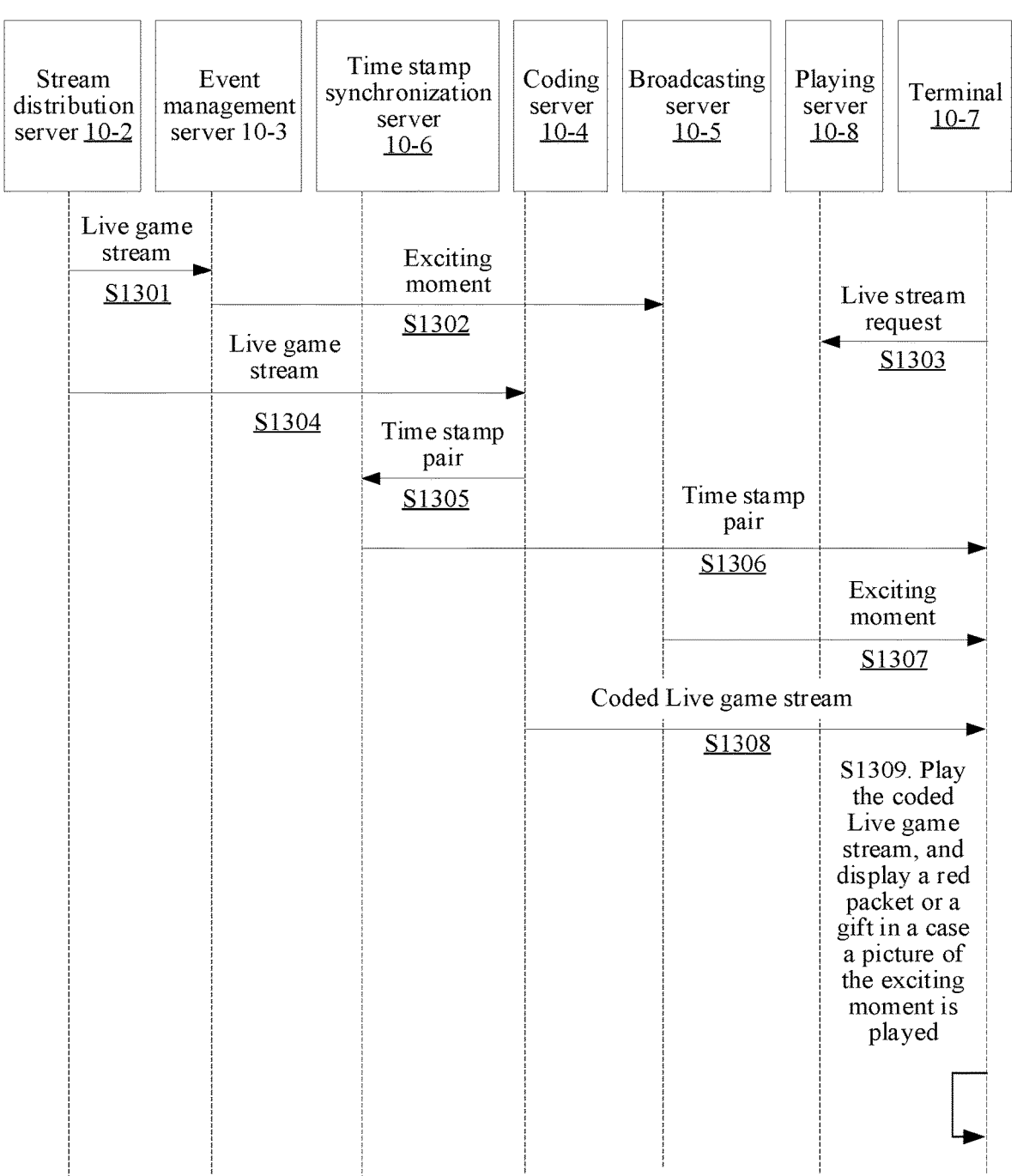
FIG. 13 is a schematic diagram of an exemplary live stream interaction according to an embodiment of this disclosure.

A detailed explanation will be made below to interactions between the stream distribution server 10-2, the event management server 10-3, the coding server 10-4, the broadcasting server 10-5, the time stamp synchronization server 10-6, the terminal 10-7, and the playing service server 10-8 in FIG. 10. FIG. 13 is a schematic diagram of an exemplary live stream interaction according to an embodiment of this disclosure. As shown in FIG. 13, the schematic diagram of the exemplary live stream interaction includes S1301 to S1309. The various steps will be explained below.

In step S1301, the stream distribution server 10-2 distributes a live game stream to the event management server 10-3.

The live game stream is the live stream ID_0 in FIG. 10.

In step S1302, the event management server 10-3 transmits an exciting moment to the broadcasting server 10-5.

The event management server 10-3 performs event marking on the live stream ID_0 to obtain each exciting moment (namely, each marking moment in FIG. 10), and transmits each exciting moment to the broadcasting server 10-5.

In step S1303, the terminal 10-7 transmits a live stream request (referred to as a playing request) to the playing server 10-8.

In step S1304, the stream distribution server 10-2 distributes the live game stream to the coding server 10-4.

The playing server 10-8 enables, in response to the live stream request, the coding server i of the coding server 10-4 to perform coding processing, thereby triggering execution of S1305.

In step S1305, the coding server 10-4 transmits a time stamp pair to the time stamp synchronization server 10-6.

The coding server 10-4 codes the live game stream (the live stream ID_0) to obtain a coded live game stream (the live stream ID_i); and transmits the time stamp pair <PTS_i0,PTS_is> formed by the time stamp corresponding to the start frame information of the live stream ID_0 in response to the live stream request and the time stamp corresponding to the start frame information of the live stream ID_i to the time stamp synchronization server 10-6.

In step S1306, the time stamp synchronization server 10-6 transmits the time stamp pair to the terminal 10-7.

It may be that the time stamp synchronization server 10-6 transmits the time stamp pair to the terminal 10-7 through the playing server 10-8.

In step S1307, the broadcasting server 10-5 broadcasts the exciting moment to the terminal 10-7.

In step S1308, the coding server 10-4 transmits the coded live game stream to the terminal 10-7.

The live stream address may be transmitted to the terminal 10-7 in response to the live stream request, so that the coding server 10-4 transmits, to the terminal 10-7, the coded live game stream (namely, the live stream ID_i in FIG. 10) matching the live stream address.

In step S1309, the terminal 10-7 plays the coded live game stream, and displays a virtual red packet or a virtual gift when a picture (for example, a video picture of "virtual penta kill" appears) of the exciting moment is played.

It can be understood that the embodiments of this disclosure record the change in the time stamps during the coding, and adjusts the exciting moment on the basis of this change. In the coded live stream, an accurate correspondence relationship between an event and time is established, which can help ensure that a response corresponding to the event is made only when a specific picture appears. Even in a case of an uncontrollable network latency, the consistency of the response logics of the various terminals can be also ensured, and a matching degree between specified processing and a played content can be increased. In addition, the processing performed by this embodiment of this disclosure on the live game stream makes the coding of the live game stream be universal. Moreover, in the processing of the live game stream in this embodiment of this disclosure, the processing of the event and the processing of the live game stream are decoupled, and will not affect each other. Thus, the universality is relatively high.

An exemplary structure of a first multimedia stream processing apparatus 455 implemented as a software module and provided by an embodiment of this disclosure is continuously described below. In some embodiments, as shown in FIG. 3, software modules stored in the first multimedia stream processing apparatus 455 of a first memory 450 may include an information obtaining module 4551, an information playing module 4552, and processing triggering module 4553.

The information obtaining module 4551 is configured to receive a to-be-decoded multimedia stream transmitted by a server device, and obtain at least one event triggering moment corresponding to the to-be-decoded multimedia stream, the at least one event triggering moment being obtained by adjusting at least one event marking moment on the basis of stream time change information, the stream time change information referring to a time change before and after coding of a multimedia stream, and each event marking moment referring to an event moment in the multimedia stream before coding.

The information playing module 4552 is configured to decode the to-be-decoded multimedia stream to obtain a to-be-played multimedia stream, and play the to-be-played multimedia stream.

The processing triggering module 4553 is configured to perform, in a case that the to-be-played multimedia stream is played to a target event triggering moment, specified processing corresponding to the target event triggering moment, the target event triggering moment being any one of the at least one event triggering moment.

In this embodiment of this disclosure, the information playing module 4552 is also configured to receive the stream time change information and the at least one event marking moment transmitted by the server device; and adjust the at least one event marking moment on the basis of the stream time change information to obtain the at least one event triggering moment.

In this embodiment of this disclosure, the stream time change information includes a to-be-coded time stamp and a coding time stamp of target frame information. The information playing module 4552 is also configured to obtain a time variation between the coding time stamp and the to-be-coded time stamp; and fuse the time variation with each event marking moment to obtain the at least one event triggering moment corresponding to the at least one event marking moment.

In this embodiment of this disclosure, the information playing module 4552 is also configured to receive the at least one event triggering moment transmitted by the server device, the at least one event triggering moment corresponding to the to-be-decoded multimedia stream, and the at least one event triggering moment being adjusted by the server device.

In this embodiment of this disclosure, the specified processing includes at least one of displaying virtual resource information, displaying a specified special effect, inter-cutting multimedia information, displaying question-and-answer information, and displaying recommendation information.

The embodiments of this disclosure further provide a computer program product or a computer program. The computer program product or the computer program includes computer-executable instructions stored in a computer-readable storage medium. A first processor of an electronic device (referred to as the player device) reads the computer-executable instructions from the computer-readable storage medium. The first processor executes the computer-executable instructions to cause the electronic device to implement the multimedia stream processing method applied to the player device according to the embodiments of this disclosure.

An exemplary structure of a second multimedia stream processing apparatus 255 implemented as a software module and provided by an embodiment of this disclosure is continuously described below. In some embodiments, as shown in FIG. 4, software modules stored in the second multimedia stream processing apparatus 255 of a second memory 450 may include an event marking module 2551, an information coding module 2552, a time obtaining module 2553, and an information transmission module 2554.

The event marking module 2551 is configured to perform event marking on a to-be-coded multimedia stream to obtain at least one event marking moment.

The information coding module 2552 is configured to code the to-be-coded multimedia stream to obtain a to-be-decoded multimedia stream.

The time obtaining module 2553 is configured to obtain stream time change information between the to-be-coded multimedia stream and the to-be-decoded multimedia stream.

The information transmission module 2554 is configured to transmit the to-be-decoded multimedia stream to a player device on the basis of the at least one event marking moment and the stream time change information, the player device being configured to play a to-be-played multimedia stream by decoding the to-be-decoded multimedia stream, and perform specified processing in a case that the to-be-played multimedia stream is played to a target event triggering moment, the specified processing corresponding to the target event triggering moment, the target event triggering moment being any one of the at least one event triggering moment, and the at least one event triggering moment being obtained by adjusting the at least one event marking moment on the basis of the stream time change information.

In this embodiment of this disclosure, the information transmission module 2554 is also configured to transmit the at least one event marking moment, the stream time change information, and the to-be-decoded multimedia stream to the player device, the player device being configured to adjust the at least one event marking moment into the at least one event triggering moment on the basis of the stream time change information.

In this embodiment of this disclosure, the information transmission module 2554 is also configured to adjust the at least one event marking moment on the basis of the stream time change information to obtain the at least one event triggering moment; and transmit the at least one event triggering moment and the to-be-decoded multimedia stream to the player device.

In this embodiment of this disclosure, the event marking is achieved by at least one of a marking operation, a neural network model, and marker information; the marking operation refers to an operation for determining the event marking moment; the neural network model is used for determining the event marking moment on the basis of a content of the to-be-played multimedia stream, and the neural network model is trained on the basis of a multimedia stream sample and a marked event moment; and the marker information refers to information for marking the event marking moment.

In this embodiment of this disclosure, the time obtaining module 2553 is also configured to obtain a to-be-coded time stamp corresponding to target frame information of the to-be-coded multimedia stream; obtain a coding manner of the to-be-decoded multimedia stream; determine a coding time stamp of the target frame information in the to-be-decoded multimedia stream on the basis of the coding manner; and determine the to-be-coded time stamp and the coding time stamp as the stream time change information between the to-be-coded multimedia stream and the to-be-decoded multimedia stream.

In this embodiment of this disclosure, the time obtaining module 2553 is also configured to determine the to-be-coded time stamp as the coding time stamp of the target frame information in the to-be-decoded multimedia stream in a case that the coding manner is a first specified coding manner, the first specified coding manner referring to a manner of not changing a presentation time stamp in a coding process; obtain a synchronizing time stamp in a case that the coding manner is a second specified coding manner, and determine the synchronizing time stamp as the coding time stamp of the target frame information in the to-be-decoded multimedia stream, the second specified coding manner referring to a manner of determining a presentation time stamp on the basis of synchronizing time information in a coding process; and determine a specified time stamp as the coding time stamp of the target frame information in the to-be-decoded multimedia stream in a case that the coding manner is a third specified coding manner, the third specified coding manner referring to a manner of determining a presentation time stamp on the basis of specified time information in a coding process.

The embodiments of this disclosure further provide a computer program product or a computer program. The computer program product or the computer program includes computer-executable instructions stored in a computer-readable storage medium. A second processor of an electronic device (referred to as the server device) reads the computer-executable instructions from the computer-readable storage medium. The second processor executes the computer-executable instructions to cause the electronic device to implement the multimedia stream processing method applied to the server device according to the embodiments of this disclosure.

The embodiments of this disclosure provide a computer-readable storage medium, storing computer-executable instructions. When the computer-executable instructions are executed by a first processor, the first processor is caused to implement the multimedia stream processing method applied to the player device according to the embodiments of this disclosure. Or, when the computer-executable instructions are executed by a second processor, the second processor is caused to implement the multimedia stream processing method applied to the server device according to the embodiments of this disclosure, for example, the multimedia stream processing method as shown in FIG. 5a.

In some embodiments, the computer-readable storage medium, such as a non-transitory computer-readable storage medium, may be a ferroelectric random access memory (FRAM), a read only memory (ROM), a programmable ROM (PROM), an erasable PROM (EPROM), an electrically EPROM (EEPROM), a flash memory, a magnetic surface memory, an optical disk, a CD-ROM, or the like. The computer-readable storage medium may include one or any combination of the aforementioned memories.

In some embodiments, the computer-executable instructions may be in the form of programs, software, software modules, scripts, or codes, written in any form of programming language (including a compiling or interpreting language, or a declarative or procedural language), and may be deployed in any form, including being deployed as standalone programs or as modules, components, subroutines, or other units suitable for use in computing environments.

For example, the computer-executable instructions may, but may not necessarily correspond to files in a file system, and may be stored as part of a file that stores other programs or data, such as in one or more scripts stored in a Hyper Text Markup Language (HTML) document, in a single file dedicated to a discussed program, or in multiple collaborative files (such as files that store one or more modules, subroutines, or codes).

For example, the computer-executable instructions may be deployed as being executed on one electronic device (at this time, this electronic device is the player device and the server device), or being executed on multiple electronic devices located at the same site (at this time, the multiple electronic devices located at the same site are the player device and the server device), or being executed on multiple electronic devices distributed at multiple sites and interconnected by a communication network (at this time, the multiple electronic devices distributed at the multiple sites and interconnected by the communication network are the player device and the server device).

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

It can be understood that in the embodiments of this disclosure, where relevant data such as multimedia streams is involved, when the embodiments of this disclosure are applied to a specific product or technology, it is necessary to obtain permissions or agreements of users, and the collection, use and processing of the relevant data are required to comply with the relevant laws, regulations and standards of relevant countries and districts.

In an example, in this embodiment of this disclosure, among the at least one event triggering moment obtained by the player device, each event triggering moment is obtained by adjusting the at least one event marking moment on the basis of the stream time change information, and the stream time change information refers to the time change before and after the coding of the live stream. Therefore, each event triggering moment obtained by the player device is a moment at which an event in a to-be-decoded live stream occurs. In this way, in the to-be-played multimedia stream obtained by decoding the to-be-decoded multimedia stream, the event content matches the event triggering moment. Accordingly, at any event triggering moment to which the to-be-played multimedia stream is played, the specified processing corresponding to the event triggering moment can be accurately triggered, so that the accuracy of triggering specified processing can be improved. In addition, the multimedia stream processing methods provided by the embodiments of this disclosure can improve the universality of triggering specified processing.

The foregoing descriptions are merely exemplary embodiments of this disclosure and are not intended to limit the scope of this disclosure. Any modification, equivalent replacement, and improvement made within the spirit and scope of this disclosure shall fall within the scope of this disclosure.

What is claimed is:

1. A method for content stream processing, the method comprising:
   receiving a coded content stream of a content stream from a server;
   obtaining second trigger timing information of the coded content stream, the second trigger timing information being determined based on a combination of first trigger timing information of the content stream and stream time change information, the stream time change information indicating a timing change between a first time stamp of target frame information in the coded content stream and a second time stamp of the target frame information in the content stream, the first trigger timing information indicating a target event in the content stream, and the second trigger timing information indicating the target event in the coded content stream;
   decoding the coded content stream;
   playing back the decoded content stream; and
   performing, when the decoded content stream is played to the target event indicated by the second trigger timing information, specified processing corresponding to the target event.

2. The method according to claim 1, wherein the obtaining the second trigger timing information comprises:
   receiving the stream time change information and the first trigger timing information from the server; and
   adjusting an event timing indicated by the first trigger timing information based on the stream time change information to obtain an event timing indicated by the second trigger timing information.

3. The method according to claim 2, wherein the adjusting the event timing indicated by the first trigger timing information comprises:
   obtaining a time variation between the second time stamp and the first time stamp; and
   adjusting the event timing indicated by the first trigger timing information according to the time variation.

4. The method according to claim 1, wherein the obtaining the second trigger timing information comprises:
   receiving the second trigger timing information from the server, the second trigger timing information being determined by the server.

5. The method according to claim 1, wherein the specified processing includes displaying secondary content.

6. The method according to claim 1, wherein the specified processing includes at least one of displaying virtual resource information, displaying a specified special effect, inter-cutting content information, or displaying information.

7. A non-transitory computer-readable storage medium, storing instructions, which when executed by a processor cause the processor to perform the method according to claim 1.

8. A method for content stream processing, the method comprising:

performing event marking on a content stream to obtain first trigger timing information of a target event in the content stream;

coding the content stream to obtain a coded content stream, the coded content stream including second trigger timing information of the target event in the coded content stream;

obtaining stream time change information that indicates a timing change between a first time stamp of target frame information in the coded content stream and a second time stamp of the target frame information in the content stream; and transmitting the coded content stream based on the first trigger timing information and the stream time change information, the second trigger timing information of the target event in the coded content stream being determined based on a combination of the first trigger timing information and the stream time change information.

9. The method according to claim 8, wherein the transmitting the coded content stream comprises:

transmitting the first trigger timing information, the stream time change information, and the coded content stream.

10. The method according to claim 8, wherein the transmitting the coded content stream comprises:

adjusting an event timing indicated by the first trigger timing information based on the stream time change information to determine an event timing indicated by the second trigger timing information; and transmitting the second trigger timing information and the coded content stream.

11. The method according to claim 8, wherein the event marking is performed by a neural network model, the neural network model being configured to determine the first trigger timing information based on content of the content stream.

12. The method according to claim 8, wherein the obtaining the stream time change information comprises:

determining the first time stamp as the second time stamp corresponding to the target frame information of the coded content stream based on a type of the coding of the content stream being determined as a first specified co ding type.

13. The method according to claim 8, wherein the obtaining the stream time change information comprises:

determining the second time stamp corresponding to the target frame information of the coded content stream according to synchronization time information based on a type of the coding of the content stream being determined as a second specified coding type.

14. The method according to claim 8, wherein the obtaining the stream time change information comprises:

determining the second time stamp corresponding to the target frame information of the coded content stream according to time unit conversion information based on a type of the coding of the content stream being determined as a third specified coding type.

15. A non-transitory computer-readable storage medium, storing instructions, which when executed by a processor cause the processor to perform the method according to claim 8.

16. An information processing apparatus, comprising:

processing circuitry configured to:

receive a coded content stream of a content stream from a server;

obtain second trigger timing information of the coded content stream, the second trigger timing information being determined based on a combination of first trigger timing information of the content stream and stream time change information, the stream time change information indicating a timing change between a first time stamp of target frame information in the coded content stream and a second time stamp of the target frame information in the content stream, the first trigger timing information indicating a target event in the content stream, and the second trigger timing information indicating the target event in the coded content stream;

decode the coded content stream;

play back the decoded content stream; and perform, when the decoded content stream is played to the target event indicated by the second trigger timing information, specified processing corresponding to the target event.

17. The information processing apparatus according to claim 16, wherein the processing circuitry is configured to:

receive the stream time change information and the first trigger timing information from the server; and adjust an event timing indicated by the first trigger timing information based on the stream time change information to obtain an event timing indicated by the second trigger timing information.

18. The information processing apparatus according to claim 17, wherein the processing circuitry is configured to:

obtain a time variation between the second time stamp and the first time stamp; and adjust the event timing indicated by the first trigger timing information according to the time variation.

19. The information processing apparatus according to claim 16, wherein the processing circuitry is configured to:

receive the second trigger timing information from the server, the second trigger timing information being determined by the server.

* * * * *